(12) United States Patent
Scobey et al.

(10) Patent No.: US 6,320,996 B1
(45) Date of Patent: Nov. 20, 2001

(54) WAVELENGTH SELECTIVE OPTICAL SWITCH

(75) Inventors: Michael A. Scobey; Robert W. Hallock; Michael Cumbo; Glenn Yamamoto, all of Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/473,479

(22) Filed: Dec. 28, 1999

Related U.S. Application Data
(60) Provisional application No. 60/114,430, filed on Dec. 31, 1998.

(51) Int. Cl.[7] .............................. G02B 6/28; G02B 6/293
(52) U.S. Cl. .............................. 385/18; 385/19; 385/24; 359/128
(58) Field of Search .................... 385/15, 16–24, 385/39, 42, 47; 359/115, 124–128, 131, 580, 581, 583–586, 588–590

(56) References Cited

U.S. PATENT DOCUMENTS

| | | | |
|---|---|---|---|
| 3,442,572 | 5/1969 | Illsley | 350/166 |
| 3,539,824 | 11/1970 | Yu et al. | 307/218 |
| 4,373,782 * | 2/1983 | Thelen | 359/124 |
| 4,599,272 * | 7/1986 | Ichikawa | 428/412 |
| 4,805,989 * | 2/1989 | Nakajima | 359/584 |
| 4,919,503 | 4/1990 | Mroynski | 350/96.2 |
| 5,218,473 * | 6/1993 | Seddon et al. | 359/589 |
| 5,504,609 | 4/1996 | Alexander et al. | 359/125 |
| 5,532,864 | 7/1996 | Alexander et al. | 359/177 |
| 5,557,442 | 9/1996 | Huber | 359/179 |
| 5,615,289 | 3/1997 | Duck et al. | 385/24 |
| 5,642,446 | 6/1997 | Tsai | 385/16 |
| 5,712,717 | 1/1998 | Hamel et al. | 359/130 |
| 5,719,705 * | 2/1998 | Machol | 359/581 |
| 5,719,989 * | 2/1998 | Cushing | 359/589 |
| 5,742,712 * | 4/1998 | Pan et al. | 385/18 |
| 5,790,314 | 9/1998 | Duck et al. | 359/654 |
| 5,822,095 | 10/1998 | Taga et al. | 359/127 |
| 5,824,374 | 10/1998 | Bradley et al. | 427/555 |
| 5,835,273 * | 11/1998 | Ida et al. | 359/584 |
| 5,838,847 | 11/1998 | Pan et al. | 385/18 |
| 6,066,401 * | 5/2000 | Stilburn | 428/432 |
| 6,128,126 * | 10/2000 | Hohenegger et al. | 359/360 |

FOREIGN PATENT DOCUMENTS

| | | |
|---|---|---|
| 0 730 173 A1 | 9/1996 | (EP) . |
| 0 887 964 A2 | 12/1998 | (EP) . |
| 60-010219 A  SHO * | 1/1985 | (JP) . |
| 60-10219 | 1/1985 | (JP) . |
| 60-112018 A  SHO * | 6/1985 | (JP) . |
| 60-112018 | 6/1985 | (JP) . |
| 02-012219 A * | 1/1990 | (JP) . |

* cited by examiner

*Primary Examiner*—Akm E. Ullah
*Assistant Examiner*—Michelle R. Connelly-Cushwa
(74) *Attorney, Agent, or Firm*—Scott Hewett; Edward Sherman

(57) ABSTRACT

An optical switch for manipulating a plurality of input optical signals incident thereupon to split one or more optical signal channels from the plurality of input optical signals. The optical switch includes an optical filter having a first reflective region and a second reflective region. One of the first and the second reflective regions is adapted with a wavelength selective filter that is capable of separating one or more optical signal channels from the input optical signal. A translating mechanism cooperates with the optical filter and is adapted to translate the optical filter in a plane substantially parallel to one of the first reflective region and the second reflective region between a first position and a second position. The translation of the optical filter causes at least one of the one or more optical signal channels to be separated from the optical signal and directed in a second direction. Additionally, another of the one or more optical signal channels to be separated from the optical signal can be directed in a third direction.

30 Claims, 19 Drawing Sheets

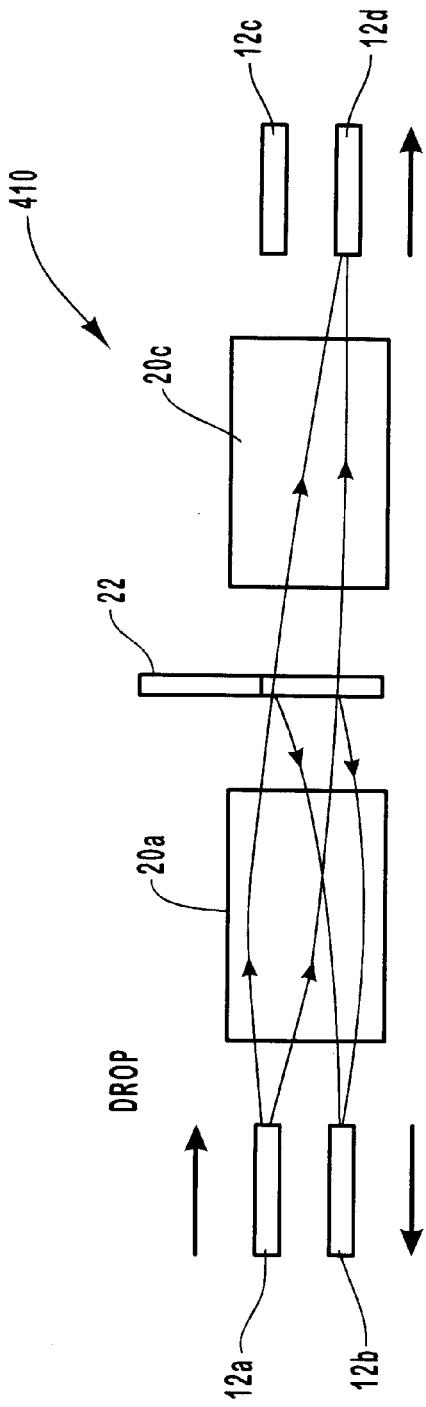
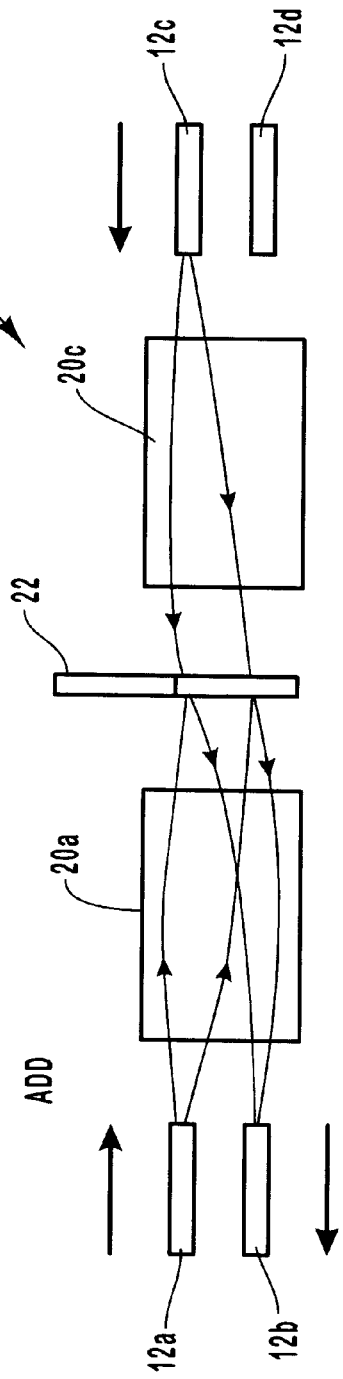
FIG. 18
FIG. 19

WAVELENGTH SELECTIVE OPTICAL SWITCH

CROSS-REFERENCE TO RELATED APPLICATIONS

This utility patent application claims priority from co-assigned U.S. Provisional Patent Application Ser. No. 60/114,430, filed Dec. 31, 1998 entitled WAVELENGTH SELECTIVE OPTICAL SWITCH by Michael A. Scobey, Robert W. Hallock, Michael Cumbo; and Glenn Yamamoto, the disclosure of which is hereby incorporated for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention generally relates to the field of optical communication technology, and more particularly to optical switches incorporating an optical filter on a switched element with applications in optical communication systems, such as optical fiber networks.

BACKGROUND OF THE INVENTION

Optical communication systems are a substantial and fast-growing constituent of communication networks. The expression "optical communication system," as used herein, relates to any system that uses optical signals to convey information across an optical waveguiding medium, such as an optical fiber. Such optical communication systems include, but are not limited to, wavelength division multiplexed ("WDM") telecommunications systems, cable television systems, and local area networks (LANs).

To convey information from multiple sources, time-division multiplexing (TDM) is frequently employed. In TDM a particular time slot is assigned to each information source, the complete signal being constructed from the signal portions collected from each time slot. Therefore, while this is a useful technique for carrying plural information sources on a single channel, fiber dispersion and other optical effects limit its capacity. While the need for communication services increases, the current capacity of installed waveguiding media is limited. Although capacity may be expanded, e.g., by laying more fiber-optic cables, such expansion is expensive.

WDM increases the capacity of installed fiber optic networks by transmitting multiple optical signal channels over a single optical fiber, each channel being assigned a particular channel wavelength. Those skilled in the art appreciate that the wavelength of an optical signal in a particular medium is related to a frequency, and that either designation may be used to describe a signal. In a typical WDM system, optical signal channels are: (1) generated; (2) multiplexed to form an optical signal constructed of the individual optical signal channels; (3) transmitted over a single waveguide; and (4) demultiplexed such that each channel wavelength is individually routed to a designated receiver. To maintain sufficient power in each optical channel, optical amplifiers, such as erbium-doped fiber amplifiers, can amplify the optical signal channels. This facilitates the use of WDM systems in trunk lines of various optical communication systems. Exemplary WDM optical communication systems are described in U.S. Pat. Nos. 5,504,609; 5,532,864; and 557,442.

In many applications, such as optical LANs, cable television subscriber systems, and telecommunications networks, there is a need to selectively change the route of one or more channels of a multiplexed optical signal from one destination to another. Such routing occurs when optical channels are sent to or received from an optical transmission line e.g., for sending of the optical channels between a terminal and an optical bus or routing long distance telecommunications traffic to individual cities.

To fully exploit the increased capacity of WDM technology, a method of routing is needed so that optical signals arriving at a single point, or node, from other locations can be efficiently routed to a selected destination. Preferably, such routing occurs without converting from optical signals to electrical signals, and should be applicable to either time domain multiplexing or re-conversion to optical signals and re-transmission. An ideal routing system is efficient, reliable, low cost, and responsive to the demands of optical signal channels arriving at the nodes.

In order to route optical signal channels to and from sources and destinations, the optical signal channels must be combined and separated, such as with wavelength-dependent multiplexers and de-multiplexers. A WDM multiplexer receives signals at different wavelengths from many sources and combines them into a single output signal. The channels are generally assigned a nominal wavelength, and the channel spacing, or separation, (expressed as wavelength or frequency) between channels is typically defined for the network. The closer the channel spacing, the greater the number of channels that may be transmitted over an optical fiber of the network. The channel spacing is limited by a number of factors, such as the stability of the light source, which is often a distributed feedback ("DFB") laser. Typically, external modulation of the light from the light source forms the encoded optical signal channel having the required information. DFB lasers have an inherently narrow line width, typically less than 1 GHz. However the optical signal channels must be spaced a sufficient distance to prevent overlap arising from signal drift.

DFB lasers, unfortunately, suffer from both steady state drift over their lifetime as well as thermal drift. The combination of both thermal and steady state drift, coupled with allowances for manufacturing variances, results in a performance envelope with a width of up to approximately ±20 GHz from a nominal wavelength position. The total envelope width, therefore, is about 40 GHz.

Recently the International Telecommunications Union has proposed a Dense WDM ("DWDM") network standard with optical signal channels having a frequency separation of 100 GHz (equivalent to a wavelength separation of about 0.8 nm). As such, the performance requirements for a DWDM network (such as those for bandwidth, cross talk, polarization dependent loss, polarization mode dispersion, insertion loss) are becoming more stringent. Additionally, it is anticipated that future efforts to increase capacity by reducing optical channel spacing will require additional improvements in optical system components, such as transmitters, receivers, multiplexers, and demultiplexers. Currently, conventional WDM multiplexer and de-multiplexer devices suffer from many performance deficiencies and consume a large portion of an optical system's attenuation loss budget. As such, any future multiplexer or de-multiplexer should be manufactured inexpensively, while also being small in size for easy installation, reliable, and have stable performance over a variety of environmental conditions.

In addition to the above problems, selective routing is difficult in a DWDM communication system because of the limitations introduced by conventional optical switches. Typically, conventional optical switches switch all incident wavelengths at once. To dynamically vary the selective routing of an optical signal channel, therefore, all signal channels are demultiplexed into signals of different wavelengths. Once the optical signals are demultiplexed, various types of electro-optical switches may be activated to redirect each signal toward its destination. Unfortunately, to effectively utilize the total bandwidth of each route, the signals must be multiplexed again, after they are switched. Thus, each potential route requires a demultiplexer, multiplexer, and optical switches for each optical channel. This combination of multiplexers and demultiplexers in series, results in signal loss from a phenomenon known as bandwidth narrowing. Additional, signal losses (such as insertion losses, polarization mode dispersion and ripple) from each combination of multiplexer/demultiplexer will accumulate, thus imposing cost penalties, such as the need for more frequent or more powerful amplification, and/or limits on the interconnection density in the network.

For the foregoing reasons, there is a need for an optical switch which can select, that is drop or add, one or more optical channels by wavelength de-multiplexing/multiplexing only those selected optical channels, with minimal attenuation or bandwidth narrowing of the other, non-selected, optical signal channels or otherwise effecting the non-selected optical channels. Additionally, there is a need for an optical switch that is small in size, highly reliable, and has only a single-point failure mode (i.e. an actuation failure affects only a single WDM channel), low insertion loss and adjacent channel tilt on all channels, and is easily interconnected or cascaded.

SUMMARY OF THE INVENTION

It is an object of the present invention to provide an optical switch that is capable of selecting one or more optical signal channels from a WDM optical signal without attenuating or decreasing the effective bandwidth of the non-selected optical signal channels. Such an optical switch is capable of dropping one or more signal channels from a WDM signal to a selected output and/or adding one or more signal channels from an input signal source. It is desirable that such a switch has a low insertion loss, and minimal adjacent channel tilt on all channels.

Another object of the present invention is to provide an optical switch that is compact and easy to manufacture. Yet another object of the present invention is to provide an optical switch that is small, while being reliable and having only a single point failure mode.

Another object of the present invention is to provide an optical switch that is easily interconnected or cascaded to form various switch configurations.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an optical switch for manipulating an input optical signal incident upon the optical switch from a first direction is disclosed. The optical switch includes an optical filter having a first reflective region and a second reflective region. One of the first and the second reflective regions is adapted with a wavelength selective filter that is capable of separating one or more optical signal channels from the input optical signal. A translating mechanism cooperates with the optical filter and translates the optical filter in a plane substantially parallel to one of the first reflective region and the second reflective region between a first position and a second position. Translation of the optical filter causes at least one or more optical signal channels to be separated from the input optical signal. The separated channel(s) may be directed in a different direction from the remaining portion of the input signal, terminated, or otherwise manipulated. Similarly, a channel may be added to the optical signal. The filter efficiently reflects the non-selected portion of the input optical signal, allowing several optical switches to be used in a variety of configurations, such as in cascade or serial configurations.

The present invention is directed to an optical switch that satisfies the need for a wavelength selective optical switch. In one application, the wavelength selective optical switch selects one or more predetermined optical signal channels from a plurality of wavelength division multiplexed optical signal channels and directs the selected optical signal channel(s) to be either dropped or added to a drop/add port, while the other optical signal channels pass through the optical switch substantially unaffected. Therefore, the optical switch optionally selects one channel (or several channels) in a given incoming wavelength multiplexed optical signal and permits the non-selected channels to pass without significant attenuation or loss. Furthermore, the optical switch is capable of selectively adding one channel (or several channels) to a given incoming wavelength multiplexed optical signal.

According to one embodiment of the present invention, the optical filter has a substrate with a first reflective region and a second reflective region. The first reflective region and the second reflective region are substantially co-planar and either of the first or second reflective region comprises a wavelength selective interference filter which corresponds to one or more selected optical signal channels. As such, the selected optical signal channels of the input optical signal incident upon the optical filter are selectively transmitted through the second reflective region, or reflected by the first reflective region, whereby the selected optical channels are directed in either a second or a third direction. Optical signal channels arriving from the third direction may be combined with optical signal channels arriving from the first direction, for co-transmission in the second direction. In a further embodiment the input optical signal is always first incident on the wavelength selective filter to minimize phase interference at the transition between the first and second reflective regions.

Generally, the thin film dielectric optical interference filters used in the present invention are a preferred form of multiplexing or de-multiplexing due to their low insertion loss, narrow bandwidth, environmental stability, and low polarization dependent loss. Furthermore, optical filters with a high number of cavities provide a sharp or square spectral response that permits very narrow optical channel spacing, preventing cross-talk and low tilt, because they closely match the envelope of laser emission defining the optical signal channel. Therefore, the present invention solves or substantially mitigates the problems associated with combining conventional optical switches and wavelength division multiplexer and demultiplexer devices, to thereby provide higher performance, reasonable costs, compact size and stable performance over many environmental conditions.

These and other features, aspects, and advantages of present invention will become better understood with reference to the following drawings, description, and appended claims.

BRIEF DESCRIPTION OF THE DRAWINGS

FIG. 18 is a schematic representation of the "drop" configuration of another alternate embodiment of the optical switch of the present invention;

FIG. 19 is a schematic representation of the "add" configuration of another alternate embodiment of the optical switch of the present invention;

DETAILED DESCRIPTION OF THE INVENTION

The present invention uses optical switches adapted with optical filters and methods for manipulating the optical filter to allow multiplexing and de-multiplexing of numerous optical signals. The inventive apparatus of the present invention is not limited to multiplexing and de-multiplexing of optical signals propagating in only one direction, but may be used in an optical communication system that operates in a duplex mode, simultaneously transmitting and receiving optical signals in different directions. Additionally, the optical switch of the present invention can route and switch optical signal channels that are not confined in an optical waveguide but switch optical signal channels that propagate in free space.

The following description is divided into several parts in order to improve the clarity of the description and to assist the reader in understanding the concepts and structures involved. First, some of the general concepts related to optical switches and optical filters are described so that it is clear how the present invention helps eliminate or substantially mitigate the problems currently related to optical switching. Upon this foundation, a detailed description of the present invention is provided together with illustrative example data and information relating to the operation of the optical switch.

An optical switch according to the present invention allows multiplexing and de-multiplexing of various optical channels to and from a common optical path. As part of the multiplexing and de-multiplexing process, it is desirable to use collimated light beams throughout the optical communication system. However, it is also desirable to minimize the free space-to-waveguide transitions to reduce the cost and size of the optical switch (e.g. by reducing the number of collimators required), as well as the insertion loss that typically accompanies such transitions. Therefore, the rays of the light beams transmitted from or directed toward the waveguides, such as optical fibers, of the particular optical network are substantially parallel. The term "collimation" as used herein means either the focusing of parallel light beams essentially to a point or line, or the collecting of light divergent from a point or line source and converting it to parallel beams. A collimator is any art-recognized device that collimates or performs collimation, as defined herein. A nominally quarter-pitch GRIN lens is an example of such a collimator.

Figure 1:
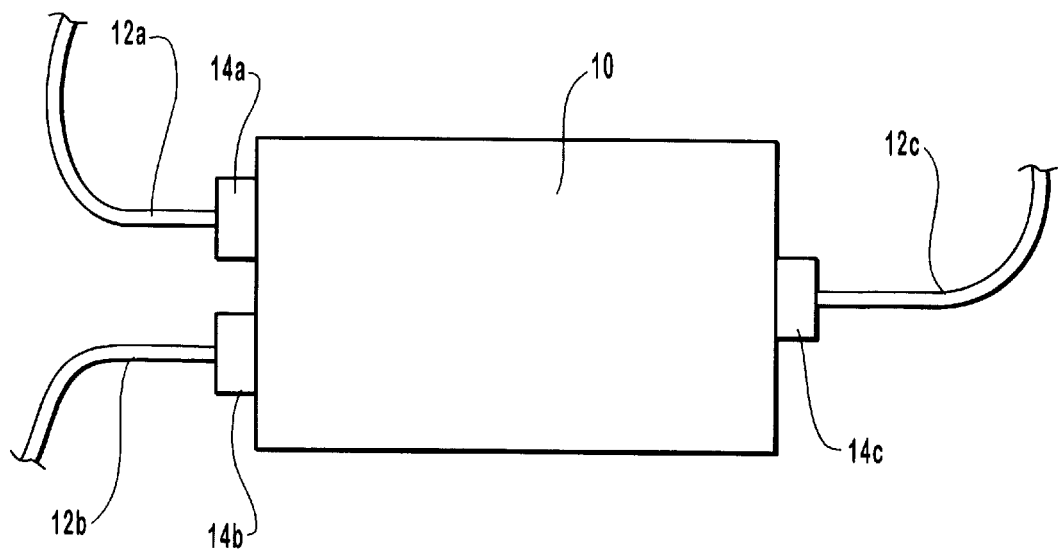
FIG. 1 is a schematic representation of one embodiment of an optical switch of the present invention.

FIG. 1 is a schematic representation of an optical switch 10. The optical switch 10 is connected to three optical waveguides 12a, 12b, and 12c, by way of ports 14a, 14b, and 14c. The optical waveguides 12a, 12b, and 12c contemplated in this invention are preferably fiber optic waveguides having a diameter between about 2–20 microns; however various other diameters and cross-sectional configurations are possible. In a more preferred embodiment, the diameter of waveguides 12a, 12b, and 12 is between about 5–15 microns. In the most preferred embodiment, the diameter of waveguides 12a, 12b, and 12c is between about 8–12 microns. It can be appreciated by one skilled in the art that various other types of waveguides may be used, such as planar waveguides formed on monolithic substrates.

Typically, each waveguide 12a, 12b, and 12c is capable of carrying a plurality of optical signal channels. In one type of application, the optical switch 10 is configured to either selectively drop or add one or more optical signal channels on one of the optical waveguides to the optical signals, if any, on another of optical waveguide. For purposes of discussion, the port, waveguide, and optical signal channel containing the optical signal to be added or dropped are designated "add/drop." The port, waveguide, and optical signal containing two or more arriving optical signal channels are designated "common", and the port, waveguide, and optical signal containing departing optical signal channels are designated "express." The "express" optical signal channels generally comprise the "common" waveguide optical signal, as modified by the operation of the optical switch 10. As depicted in FIG. 1, waveguide 12a is the "common", waveguide 12b is the "express", and waveguide 12c is the "add/drop." It will be appreciated by one skilled in the art, however, that the designation of a waveguide 12a, 12b, and 12c as a "common", "express", or "add/drop" may vary based on the particular use of optical switch 10.

Although optical switch 10 is shown connected to three waveguides 12a, 12b, 12c and three port 14a, 14b, 14c, it can be appreciated that a number of waveguides and ports greater than or less than three may be attached to and cooperate with optical switch 10. For example, it will be recognized that the 3-port device depicted in FIG. 1, has a position available for a fourth port. As such, optical switch 10 may be configured with one "common" port, one "express" port, and two "add/drop" ports. The two "add/drop" ports can be dedicated to separate functions in which one port is only an add port and the other port is only a drop port, for example. Alternatively, each of the add/drop ports can independently function in either the add or drop mode.

Figure 2:
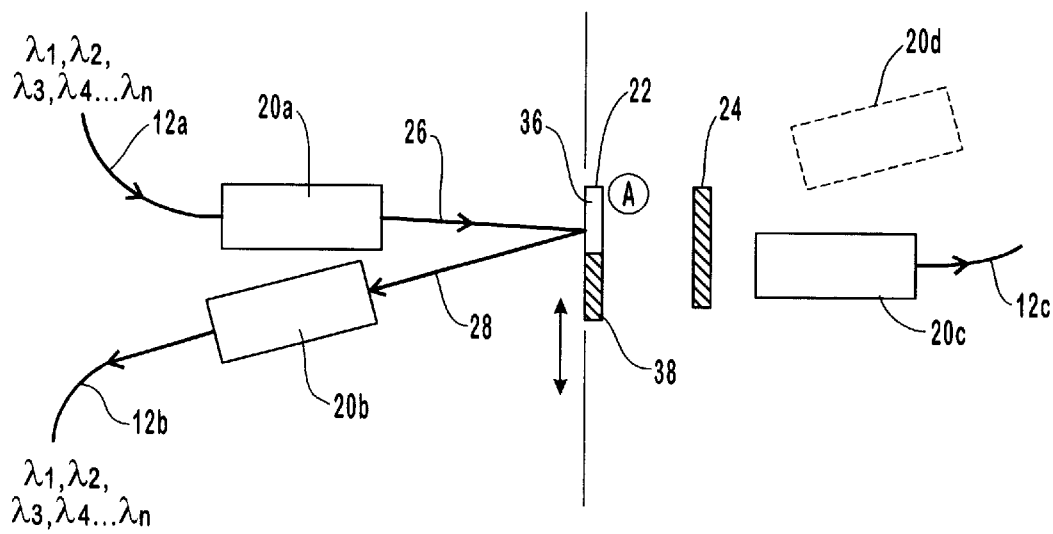
FIG. 2 is a schematic representation of the internal components of the optical switch in FIG. 1, in a first state.

FIG. 2 is a simplified schematic of an optical switch according to the present invention in a first switch position. Optical switch 10 has a plurality of collimators 20a, 20b, and 20c, an optical switch element 22 in a first position, and a stationary post filter 24. Collimators 20a, 20b, and 20c are in the optical paths between waveguides 12a, 12b, and 12c and optical switch element 22. Collimator 20a focuses the light exiting from waveguide 12a to create a first beam 26, which is incident upon a broadband reflective region 36 of optical switch element 22. Collimator 20b collects the light reflected from the optical switch element 22 having the form of a second beam 28 that is transmitted to waveguide 12b.

Figure 3:
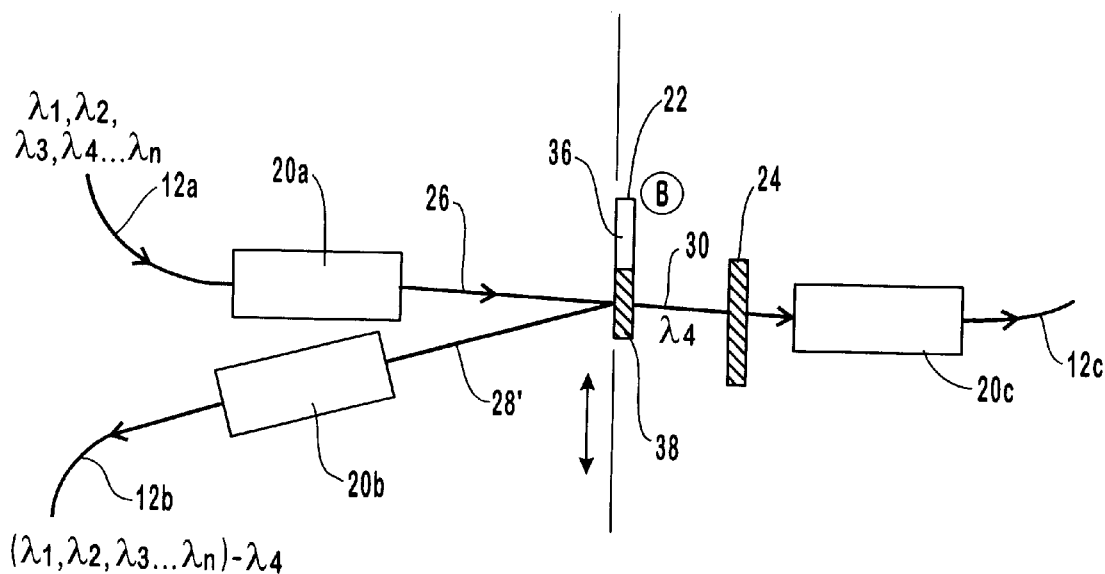
FIG. 3 is a schematic representation of the internal components of the optical switch in FIG. 1, in a second state.

Collimator 20d represents an exemplary position for an add port. An add waveguide (not shown) could provide a channel to be added to the express signal on express fiber 12b when the switch is in the wavelength selective state (ref. FIG. 3). Collimator 20d would be generally aligned with collimator 20b, as collimator 20a is aligned with 20c, to achieve the desired optical coupling. An alternative configuration to operate the switch represented in FIGS. 2 and 3 in as an add switch would be to provide the common optical signal on fiber 12b, with fiber 12c adding a channel(s) to be expressed on fiber 12a. In other words, the optical switch element can operate in a reciprocal fashion, and a single switch layout can be used as an add element or a drop element depending on how the ports of the switch are connected to the network.

FIG. 3 is a simplified schematic of the optical switch shown in FIG. 2 in a second switch position. Collimator 20c collects the light transmitted through a wavelength selective region 38 of the optical switch element 22 and transmits a third beam 30 to waveguide 12c. As seen by comparing of FIGS. 2 and 3, the optical filter has been moved (switched) from the first position to the second position. The optical switch 10 may include other collimators, waveguides, or other optic devices as necessary, represented by collimator 20d (as shown in FIG. 2).

Figure 4:
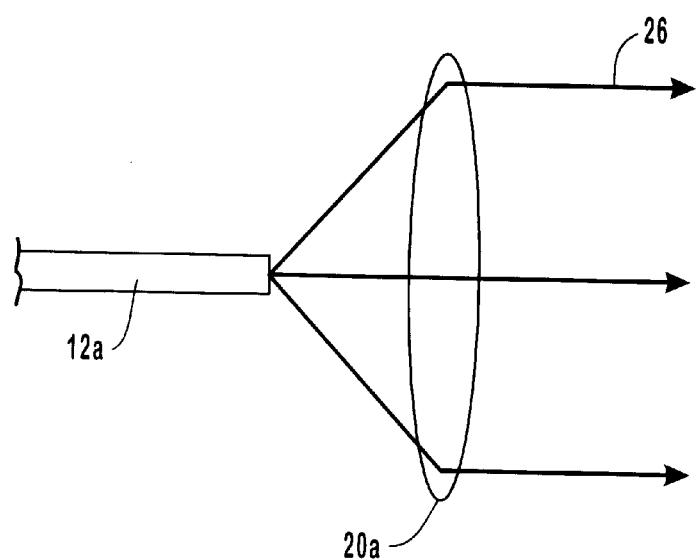
FIG. 4 is a schematic representation of one embodiment of a collimator of the optical switch of the present invention.

FIG. 4 is a simplified schematic representation of a collimator 20a. Collimator 20a has a lenticular form. The shape of the lens causes collimation of the divergent light exiting from waveguide 12a as the light passes there though. It can be appreciated that one skilled in the art may identify various other configurations of collimator 20a, that are appropriate, such as by way of example and not limitation, gradient index ("GRIN") lenses, homogeneous lens, aspheric lenses, or the like. Additionally, although discussion is made herein relative to collimator 20a, it will be appreciated that similar features are present with respect to collimators 20b and 20c.

Referring again to FIGS. 2 and 3, disposed between collimators 20a, 20b, and 20c is optical switch element 22. Optical switch element 22 can either separate or combine various optical signal channels incident thereupon, for example combining the "common" with an "add" to generate the "express" or passing (removing) a "drop" from the common to generate the express, or dropping a channel from the common, and adding a channel at the same nominal wavelength as the dropped channel to generate the express. As such, different regions of optical switch element 22 have varying spectral characteristics to allow multiplexing or de-multiplexing of numerous optical signal channels. As depicted in the embodiment of FIG. 2, optical switch element 22 has a broadband reflective region 36, such as a metallic mirror layer or multi-layer thin film reflector, and a narrow, or wavelength selective (e.g. bandpass), region 38 thereby defining two states of optical switch 10.

FIG. 2 shows the optical switch 10 in a first switch state where the optical signal from the common waveguide 12a is reflected to the express waveguide 12b by the broadband reflective region 36. FIG. 3 shows the optical switch 10 in a second switch state where the wavelength selective region 38 of the optical switch element 22 is positioned to transmit a channel, designated as $\lambda_4$, to add/drop waveguide 12c, and to reflect the remaining channels of the optical signal from the common waveguide to the express waveguide 12b. It is recognized that the wavelength selective region could be configured to transmit a number of channels, such as a range of wavelengths spanning multiple channels.

Figure 5:
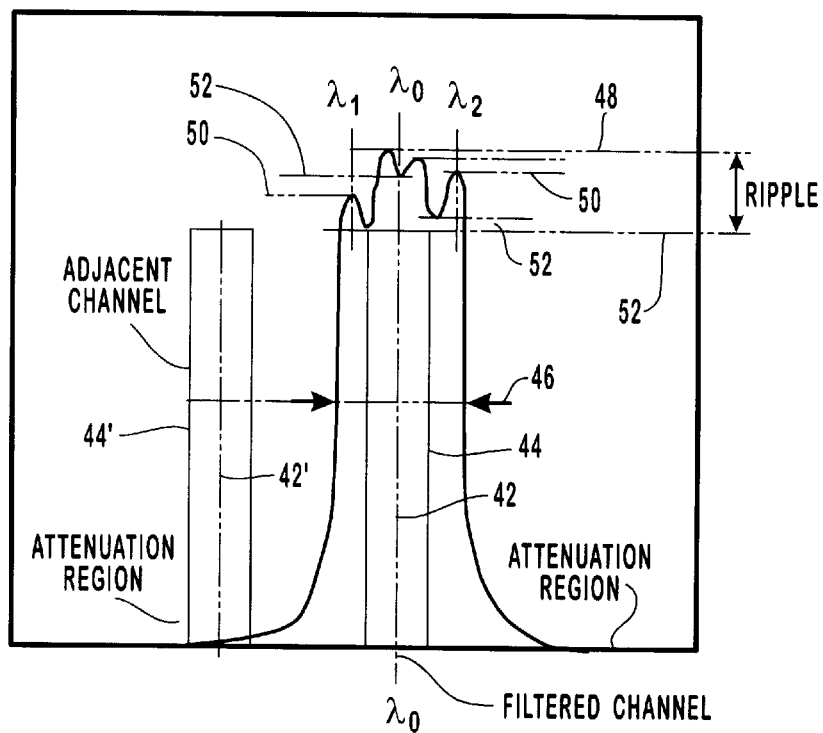
FIG. 5 is a graphical representation of the spectral characteristics of one optical filter of the present invention in FIG. 1.
Figure 6:
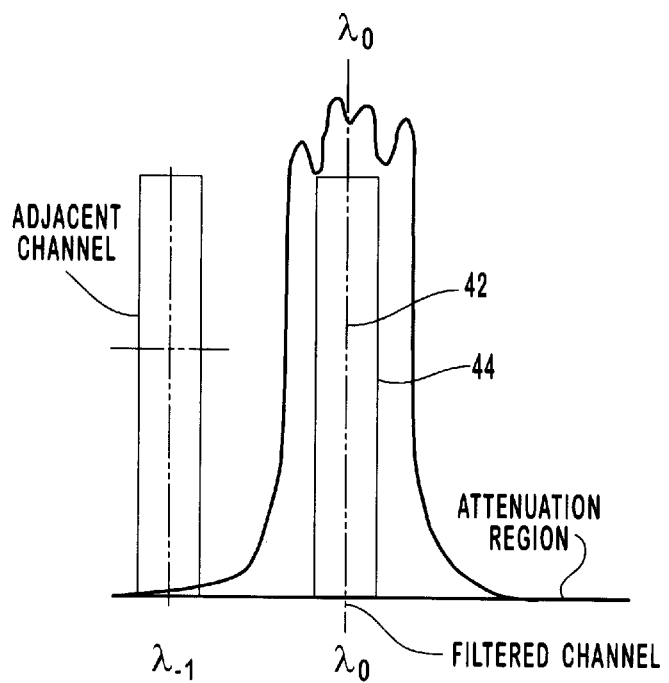
FIG. 6 is another graphical representation of the spectral characteristics of one optical filter of the present invention in FIG. 1.

FIGS. 5 and 6 illustrate spectral characteristics and properties of an exemplary wavelength selective region of an optical filter according to the present invention. The ordinate (y-axis) shows optical filter transmittance as a function of wavelength (plotted on the abscissa, or x-axis). The optical signal channels are represented by lines 42, 42' (indicating the center wavelength, $\lambda_0$) and boxes 44, 44' representing the channel envelope. The optical switch element 22 has a pass band region optimally centered about the center wavelength So. The bandwidth of the optical switch element 22 being defined as the difference in wavelength, or frequency of the filter function at the half power point (−3 dB point) 46 of the filter function at the given wavelength. For example, from a reference level of 0 dB insertion loss, the width of the filter at −3 dB insertion loss is measured. In an embodiment of the present invention, this width is less than the channel spacing (e.g. 100 GHz). The width of the channel envelopes, often referred to the "clear channel", are less than 100 GHz, and in one instance is about 30 GHz. Thus, the bandpass filter typically has a width between about 50–100 GHz. Other systems might have different channel spacing, such as 200 GHz, or different clear channel requirements, i.e. filter widths. Accordingly, the specific values given above are exemplary for purposes of illustration.

Ideally, the pass band of optical switch element 22 has steep sides, square corners, high transmission in the pass band, and low ripple. The pass band contains multiple peaks of transmittance that differ by between about 0.5 dB and preferably less than about 0.2 dB. The difference in transmittance between the highest maxima or maximum height 48 and the lowest minima 52 within the pass band is termed "ripple."

Generally, it is desirable that the filter pass band follow the shape of the channel, to allow the optical signal channels to be located closer together and allow a greater number of channels to be defined within a given range of wavelengths. However, the transmittance characteristics of actual filters diverge from the straight-sided, flat-topped, square-cornered channel definition 44. One example of such divergence is ripple, discussed above. Another is the filter "skirt" or "tail" region 43, which may overlap with an adjacent channel 44'. Such overlap can result in cross talk and high levels of adjacent channel tilt. For example, if the first channel 44 carries broadband noise throughout the range of the adjacent channel 44', the noise floor of the adjacent channel will be tilted from the overlapping filter skirt 43. A thin-film band pass filter, as described below, provides a desirable filter shape with low levels of both cross-talk and tilt thereby reducing the interference and losses occurring between the optical signals of adjacent channels.

Referring again to FIG. 2, disposed between optical switch element 22 and collimator 20c is a stationary post filter 24. Post filter 24 is optional; however, use of post filter 24 can improve the optical signal channel selection sensitivity of optical switch 10. Post filter 24 may take various forms such that when wavelength selective region 38 acts as a narrow band pass filter, stationery post filter 24 may be a similar filter that compliments or refines the filter characteristics of the switched filter. This allows optimizing filter characteristics for each filter, especially since the post filter may be designed to be responsive solely to the selected wavelength(s), whereas the wavelength selective portion of the optical switch element is designed with the entire range of wavelengths that might be presented by the common optical fiber in mind. In particular, the post filter might have superior out-of-band rejection, thus reducing potential noise from adjacent channels. Therefore, the combination of the post filter 24 with the wavelength selective region 38 of the optical switch element 22 can improve the shape of the combined pass band region, thus permitting closer spacing of optical signal channels. Alternatively, the addition of a post filter may allow use of a switched filter having lower performance, according the system requirements and other considerations, such as cost.

Optical switch element 22 and post filter 24 may be used in a variety of alternative configurations. Instead of being two elements separated by a gap, post filter 24 and optical switch element 22 may be laminated together, i.e. both switched. In another alternate configuration, post filter 24 may be coated directly on the surface of collimator 20c. It can be appreciated, therefore, that various other embodiments of optical switch element 22 and post filter 24 are possible and known to one skilled in the art.

Following is a brief discussion of the general operation of optical switch 10 of FIGS. 2–3. The discussion provides a contrast of the operation of optical switch 10 in the non-selective and selective states. The operation of the optical switch 10 in the wavelength selective state, is illustrated in FIG. 3. The optical switch element 22 is moved essentially parallel to the plane formed by its front surface (illustrated by the dashed line in FIG. 3) by a distance greater than the diameter of first beam 26. First beam 26 from the common waveguide 12a is projected onto wavelength selective region 38 of optical switch element 22, which transmits one or more channels to the drop waveguide 12c, and reflects the remainder of the channels to the express waveguide (optical fiber) 12b. The filter characteristics of the wavelength selective region allow the selected wavelengths to be transmitted with minimal attenuation, and reflect the remaining wavelengths with minimal attenuation, polarization, or distortion, compared to other drop (de-multiplexer) configurations. Such filter characteristics may be obtained by a thin-film dielectric stack, for example. Those skilled in the art will appreciate that an add (multiplexer) configuration is similarly derived.

In the non-selective state, illustrated in FIG. 2, the common waveguide 12a carrying two or more optical signal channels having wavelengths $\lambda_1, \lambda_2, \lambda_3, \lambda_4 \ldots$ to $\lambda_n$, is optically coupled to collimator 20a. Collimator 20a collects substantially all of the light exiting as a divergent beam from the optical fiber, thereby forming parallel first beam 26. First beam 26 is projected onto the broadband reflective region 36 of the optical switch element 22. The broadband reflective region 36 reflects substantially all the optical signals having wavelengths $\lambda_1, \lambda_2, \lambda_3, \lambda_4 \ldots$ to $\lambda_n$ forming parallel second beam 28. Second beam 28 10 enters collimator 20b that optically couples second beam 28 as the input beam for express waveguide 12b. It is desired that the optical switch element 22 may be switched from one position to another with minimal disruption of the express channels. Thus, it is desirable to minimize the effects of the transition between the broadband reflective region and the wavelength selective region.

Figure 7:
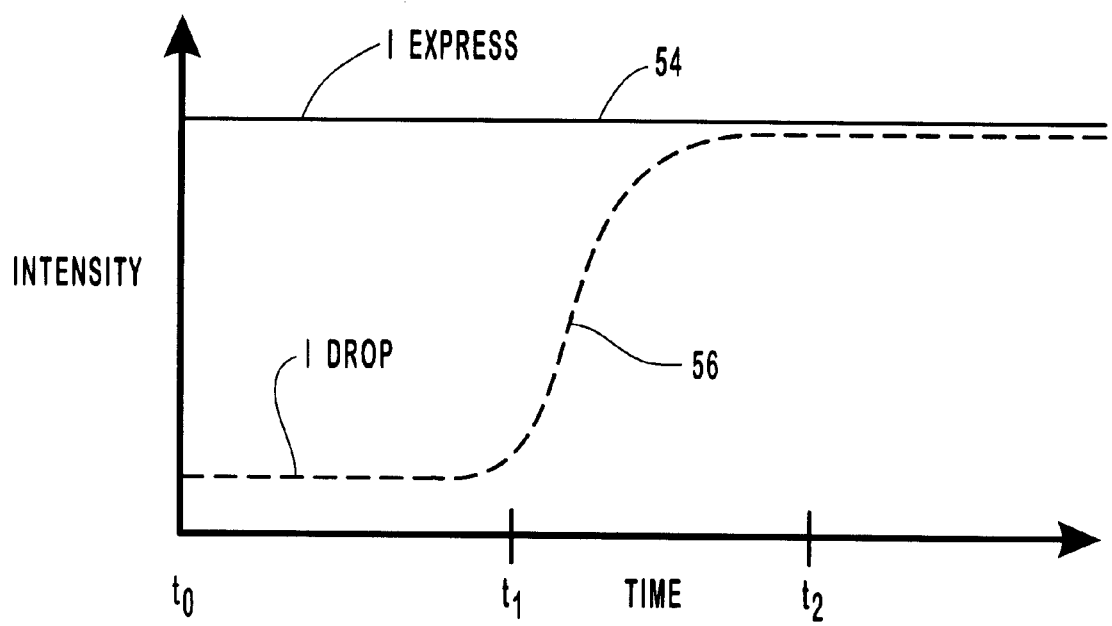
FIG. 7 is a graphical representation of signal power of the "add/drop" and "express" channels according to one embodiment of the present invention.

FIG. 7 is a schematic diagram illustrating signal power in both the "add/drop" and the "express" channels for the above-described optical switch 10. The "add/drop" channel and "express" channels are centered at different wavelengths. Power is plotted on the ordinate while time is plotted on the abscissa. Optical switch 10 initially begins in a first state at time $t_0$. A signal is applied at time $t_1$ to activate optical switch 10 so that optical switch 10 is in a second state at time $t_2$. Switch time is defined as the difference between $t_1$ and $t_2$. The intensity, or power, of the optical signal channels transmitted through the express waveguide 14b is shown by line 54. Note that the express channel is not attenuated either in the first state, second state or during the transition between these states. In contrast, the intensity of the selected optical signal channel (line 56) is available for communication at time $t_2$. While it generally desirable that the switch be as short as possible for quick connection with the add/drop waveguide, a finite switch time does not limit the utility of this device because a repeatable switch time may be used in the communication timing protocol. Specifically, the express optical signal channels are not affected during the switch operation, and the timing protocol is only required in the add/drop channel at the start of transmission, to secure complete integrity of the channels information content.

Figure 8:
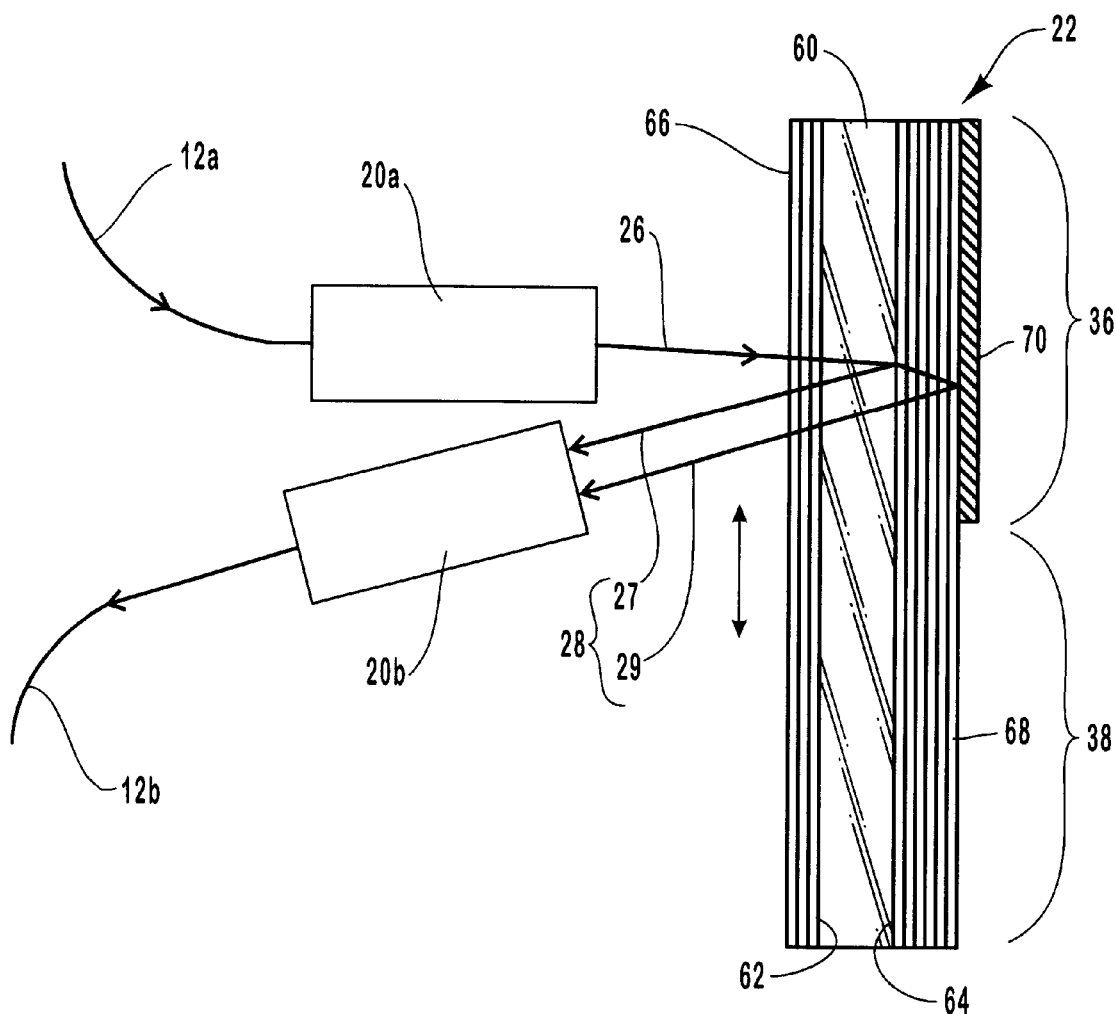
FIG. 8 is a schematic representation of one embodiment of an optical filter and reflector according to an embodiment of the present invention.

FIG. 8 is a simplified schematic representation of an optical filter element according to an embodiment of the present invention. Optical switch element 22 includes a substrate 60 having a first surface 62 and a second surface 64. Substrate 60 is preferably fabricated from glass, however various other optical materials are suitable and known by one skilled in the art. An optional antireflection coating 66 is deposited on the first surface of substrate 60. The antireflection coating 66 minimizes reflection of ambient light, if any, into the collimators 20a, 20b, light lost due to front-surface reflections, and minimizes Fresnel reflection signal losses compared to an un-coated substrate.

Deposited on second surface 64 is a wavelength selective filter 68 that is capable of separating or combining various optical signal channels incident thereupon. Preferably, wavelength selective filter 68 is a non-polarizing narrow band pass filter, however various other types of filter are applicable, such as those described in U.S. Pat. Nos. 5,615,289, 5,719,989 and 4,373,782. The use of a multi-layer thin film narrow band pass optical interference filter for wavelength selective filter 68 provides significant performance advantages over other filters, such as fiber Bragg grating filters. The narrow band pass optical interference filters with a large number of cavities provide a sharp spectral response, low adjacent channel tilt, and low insertion loss (<1.2 dB). Other systems may have other performance requirements, allowing filters with other performance characteristics to be used.

Layered upon a portion of wavelength selective filter 68 is a reflective coating 70. Reflective coating 70, which can be in the form of a metallic thin film for example, acts as a non-wavelength selective, i.e. broadband, reflector. Alternatively, a sequence of dielectric layers may form the reflective coating. Generally, the combination of wavelength selective filter 68 and reflective coating 70 act as broadband reflective region 36 because the wavelength selective filter portion of the combination transmits the selected wavelengths to the reflective coating portion, which reflects the selected wavelengths back to the express collimator 20b along with the non-selected wavelengths, which are reflected by the wavelength selective filter. The reflective region is typically made from a film of suitable metal having high reflectivity over the range of wavelengths of interest, such as gold, platinum, silver, aluminum, and copper. A preferred metal is gold because it has high reflectivity from the near infrared-to-infrared regions, encompassing the currently common wavelength range for optical fiber transmission. The gold coating layer is typically between about 50–200 nm thick to achieve a signal loss of less than 0.1 dB, thereby providing a reflectivity of greater than about 97%, but may be thicker.

A more preferred alternative to a metal film is a dielectric multi-layer film. 5 The dielectric multi-layer film is typically formed from a number of alternating layers of dielectric materials in the order of LHLHL . . . , where H and L are high and low refractive indices of the dielectric materials, and each HL pair of layers forms a period. Each layer has an optical thickness of about a quarter wavelength, at the wavelength selected for high reflectivity. The wavelength selected for high reflectivity is generally the wavelength transmitted by the wavelength-selective filter portion, but a suitable reflector can be fabricated to reflect the range of wavelengths typically carried on an optical fiber because the wavelength range is still narrow by conventional standards. To achieve the desirable reflectivity of greater than 99% over the desired wavelength range; typically about 7–10 periods, i.e. 14 to 20 total layers are required. It will be recognized by those skilled in the art that suitable admittance matching layers may be deposited under reflective coating 70 to optimize the total reflectivity.

Figure 9A:
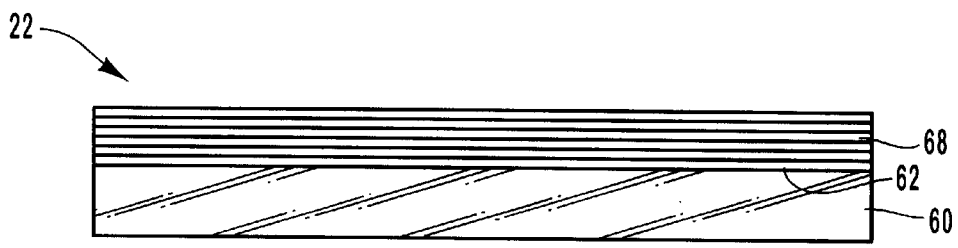
FIGS. 9A–9D are a series of simplified side views illustrating a fabrication sequence of the optical filter in FIG. 8.
Figure 9B:
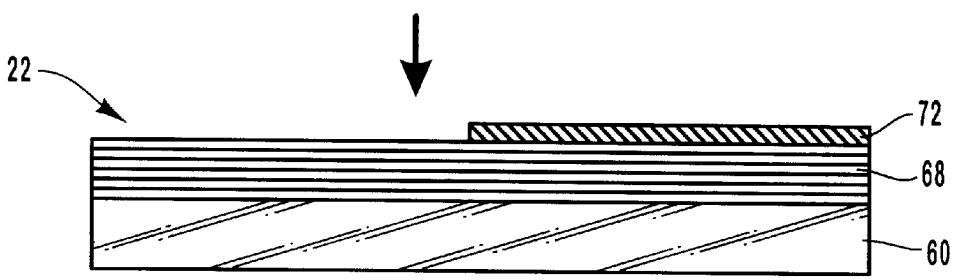
Figure 9C:
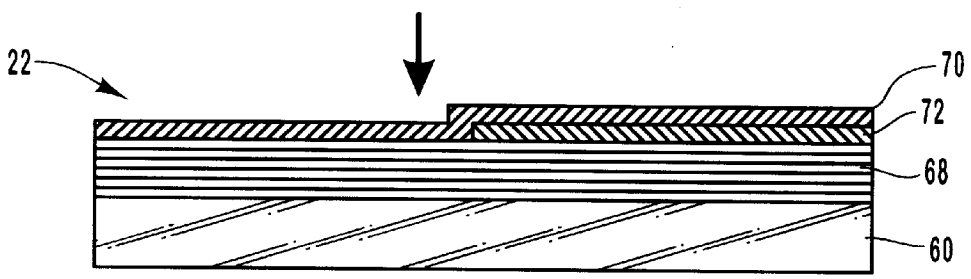
Figure 9D:
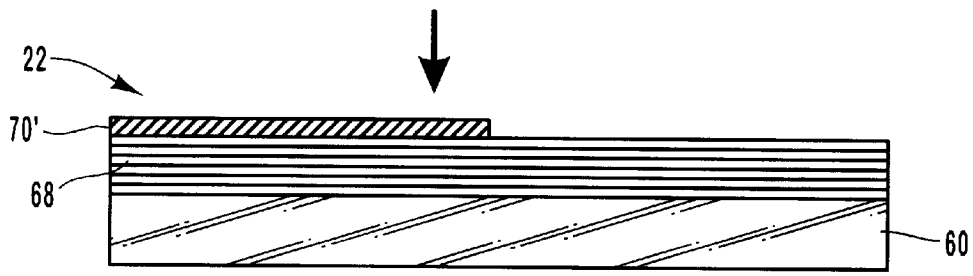

FIGS. 9A–9D are simplified side views of a substrate processed according to a fabrication method of an optical filter element as shown in FIG. 8. Substrate 60 is provided before deposition of the various coatings. In FIG. 9A, wavelength selective optical filter 68 is deposited on first surface 62 of the flat and rigid substrate 60. FIG. 9B shows a patterned photoresist layer 72 formed on a selected region of the wavelength selective optical filter 68. FIG. 9C shows the reflective coating 70, typically formed as a single layer of metal (gold). formed on the photoresist layer 72 and the exposed portion of the wavelength selective optical filter 68. FIG. 9D shows the remainder of the reflective coating 70', which will be the reflective portion, after the photoresist layer has been stripped, thus lifting off the portion of the metal layer overlying the photoresist layer. Those skilled in the art understand that other sequences could be used, such as depositing the metal layer first, making the metal layer with a patterned photoresist layer, and using an etch process to remove the exposed portions of the metal layer. The resultant structure of the reflective portion and wavelength selective portion are referred to as a "tiled" filter structure. The broadband reflective region of the optical switch element 22 is defined by reflective coating 70 and wavelength selective filter 68, while wavelength selective region 38 is defined by wavelength selective filter 68 alone. An extremely thin gold layer does not significantly reduce the signal by the defocusing or deflecting the reflected beam.

A feature of optical switch element 22 of the present invention is the optical coatings used to form broadband reflective 36 and wavelength selective 38 regions of optical switch element 22 are preferably selected and arranged to substantially match the phases during the transition between the broadband reflective region and the wavelength selective region. If the phase of the signals is not substantially the same from the broadband reflective region 36 and wavelength selective region 38 of optical switch element 22 then destructive interference can occur between light rays reflected off the respective regions during translation of the optical filter element. Such interference can reduce the express channel signal intensity at certain frequencies, thereby reducing the effectiveness of the optical switch. One way to modify the phase change during the transition between the two regions to add extra coating layers. An alternate approach to minimizing the problems associated with matching the phase change on reflection is to orient optical switch element 22 such that the beam carrying the express optical signal channels is always reflected by wavelength selective filter 68. This requires positioning wavelength selective filter 68 between the common waveguide 12a and the reflective coating 70.

Referring again to FIG. 8, first beam 26 from common waveguide 12a illuminates antireflection coating 66 on second surface 64 of optical switch element 22. The signals 29 within the selected wavelength range of the wavelength selective filter 68 pass through the filter and are reflected by the reflective coating 70. The remaining signals 27 are reflected off the wavelength selective filter 68. It is understood that the reflections are shown as occurring at an interface plane for convenience of illustration. In this configuration, the reflected beam of light 28 incident upon collimator 20b includes signals reflected from two different planes of the optical filter element, and the selected signal is offset from the non-selected signals.

To avoid signal loss from beam splitting, the angle between the first beam 26 and second beam 28 should be as small as possible. This is further necessitated since the selected optical signal channel is also offset by multiple reflections in optical switch element 22, as described in co-pending, co-assigned U.S. patent application Ser. No. 09/130,137 entitled OPTICAL ,COUPLER DEVICE FOR DENSE WAVELENGTH DIVISION MULTIPLEXING, by Michael Cumbo and Robert Klinger, filed Aug. 6, 1998, (Attorney Docket No. 13392.79) the disclosure of which is incorporated herein by reference for all purposes.

Figure 10:
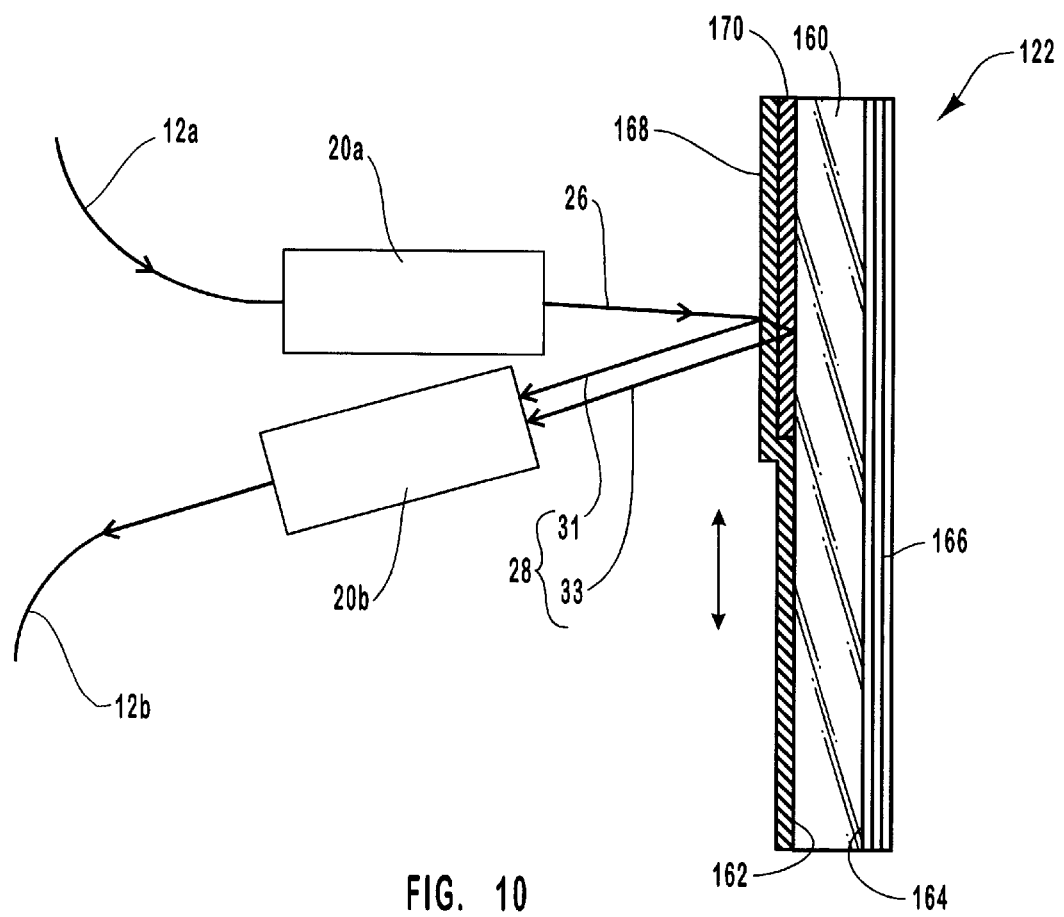
FIG. 10 is a schematic representation of an optical filter according to another embodiment of the present invention.

FIG. 10 is a simplified schematic of an alternative embodiment of an optical switch element 122 according to the present invention. The majority of the features discussed with respect to the optical switch element 122 discussed in conjunction with FIG. 8 also apply to optical switch element 122. Optical switch element 122 has a substrate 160 having a first surface 162 and a second surface 164. Deposited on second surface 164 is an optional antireflection coating 166. The opposite or first surface 162 is partially coated with a reflective coating 170, which can be either a single metallic layer or a plurality of metallic or dielectric layers. Deposited on both the exposed region of first surface 162 and reflective coating 170 is a wavelength selective filter 168.

Figure 11A:
FIGS. 11A–11D are a series of simplified side views illustrating a fabrication sequence of the optical filter in FIG. 10.
Figure 11B:
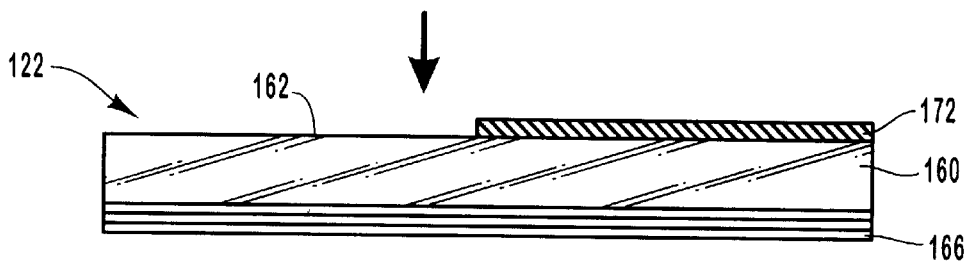
Figure 11C:
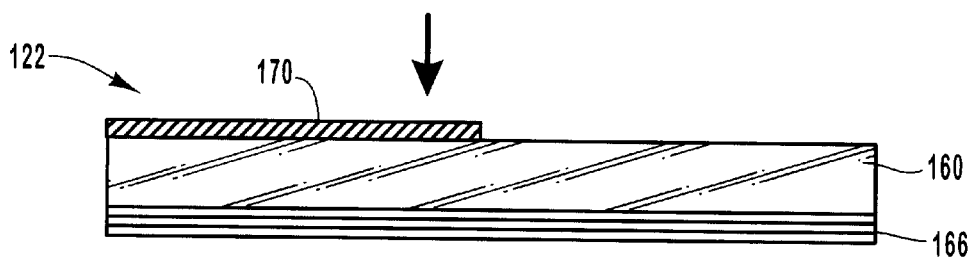
Figure 11D:
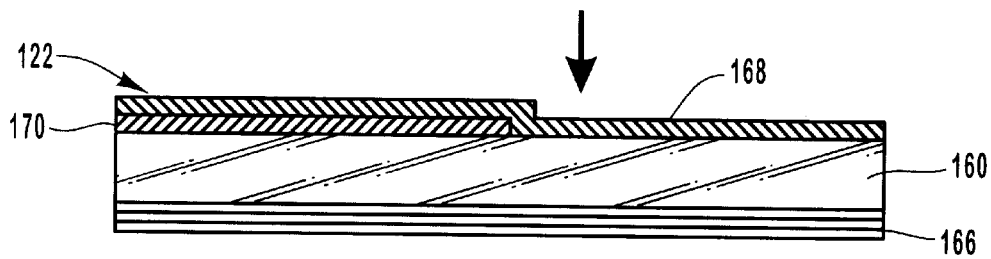

FIGS. 11A–11D are simplified side views of a substrate during a fabrication sequence of an optical switch element 122 fabrication sequence. FIG. 11A shows the starting substrate 160, optionally has antireflection coating 166 applied to second surface 164 thereof. FIG. 11B shows a first surface 162 partially coated with a photoresist layer 172. A reflective coating (not shown) is then deposited over the photoresist layer and the exposed portion of the first surface. FIG. 11C shows the substrate after the photoresist layer 172 has been removed to expose a portion of substrate 160 adjacent to a region covered by the reflective coating 170. FIG. 11D shows the substrate after a wavelength selective filter 168 has been deposited to coat both reflective coating 170 and the exposed portion of first surface 162 of substrate 160.

Referring again to FIG. 10, in one particular orientation of optical switch element 122 the common waveguide 12a illuminates the surface of optical switch element 122 with an optical signal that is incident upon wavelength selective filter 168. In the (shown) non-selective state, the non-selected channels 31 are reflected off the wavelength selective filter, while the selected channel(s) 33 is reflected off the reflective coating 170, both being directed to the express collimator 20b. In the non-selective state (not shown), the non-selected channels are likewise reflected off the wavelength selective filter, which passes the selected channel(s) through to the add/drop port (not shown).

It can be appreciated that a broadband reflective region and a wavelength selective region can operate as interference filters or reflective filters. Additionally, the locations of a broadband reflective region or wavelength selective region are not restricted to the front surface of an optical filter element, but may be similarly disposed on the back surface or on an intermediate surface, i.e. between the front and back surfaces. Additional layers or coatings defining wavelength selective filter and non-wavelength selective filter may be deposited thereon, in either of the external surfaces of an optical filter element. Additionally, the coatings or layers may serve to modify the phase of light reflected by either of filters/regions or function as an optional post filter. The additional coating/layers may be applied over the entire surface of optical filter element, or can be applied over a portion of the surface, as discrete regions, each discrete region performing a specific function when the optical filter element is moved such that the collimated optical beams illuminate the selected region.

Figure 12:
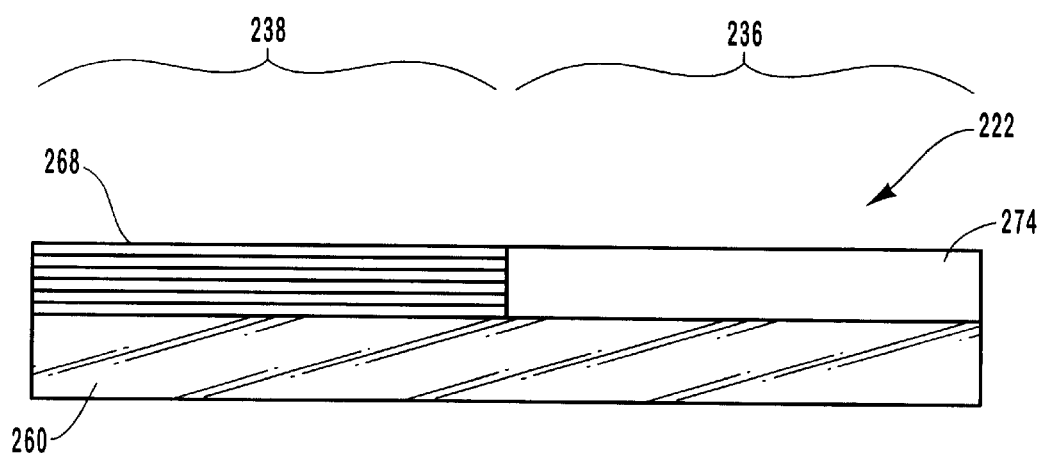
FIG. 12 is a simplified side view of another embodiment of the optical filter according to the present invention.

FIG. 12 is a simplified side view of another embodiment of an optical switch element 222 illustrating a high-pass/low-pass configuration. Optical switch element 222 comprises a substrate 260 with a short wave pass region 238 defined by a short wave pass filter 268. The short wave pass filter 268 is used to separate one or more optical signal channels, while a long wave pass region 236, defined by a long wave pass filter 274, is used to select the complimentary optical signal channels that are passed or "expressed" by the short wave pass region 238.

Thus, useful embodiments of an optical switch (FIG. 1, ref. num. 10) are not limited to narrow band-pass filters for the wavelength selective region 38 of optical switch element 22. While a narrow band-pass filter is preferred for selecting a single optical signal channel, such as when the channel spacing is 100 GHz, an optical filter with a wider pass band, for example greater than 400 GHz can be used to split off four optical channels. Alternatively, either short wave pass or long wave pass filter can be utilized to select a multiplicity of channels or direct portions of the input common channel into two or more separate routes. It can be appreciated that broadband reflective region 36 can be replaced with any of the aforementioned optical filters. When optical switch element 22 comprises two or more different optical interference filters an alternative method of fabrication may be used to ensure that the front faces of the adjacent filters are substantially co-planar. Patterned optical thin-film filters suitable for use in this invention may be made by the procedures described in U.S. Pat. No. 5,824,374. It will be recognized that useful embodiments of optical switch element 22, that is a combination of filters arranged as tiles on a surface or interface, can be fabricated by a variety of methods, such as lamination, reactive etching, and the like.

Figure 13:
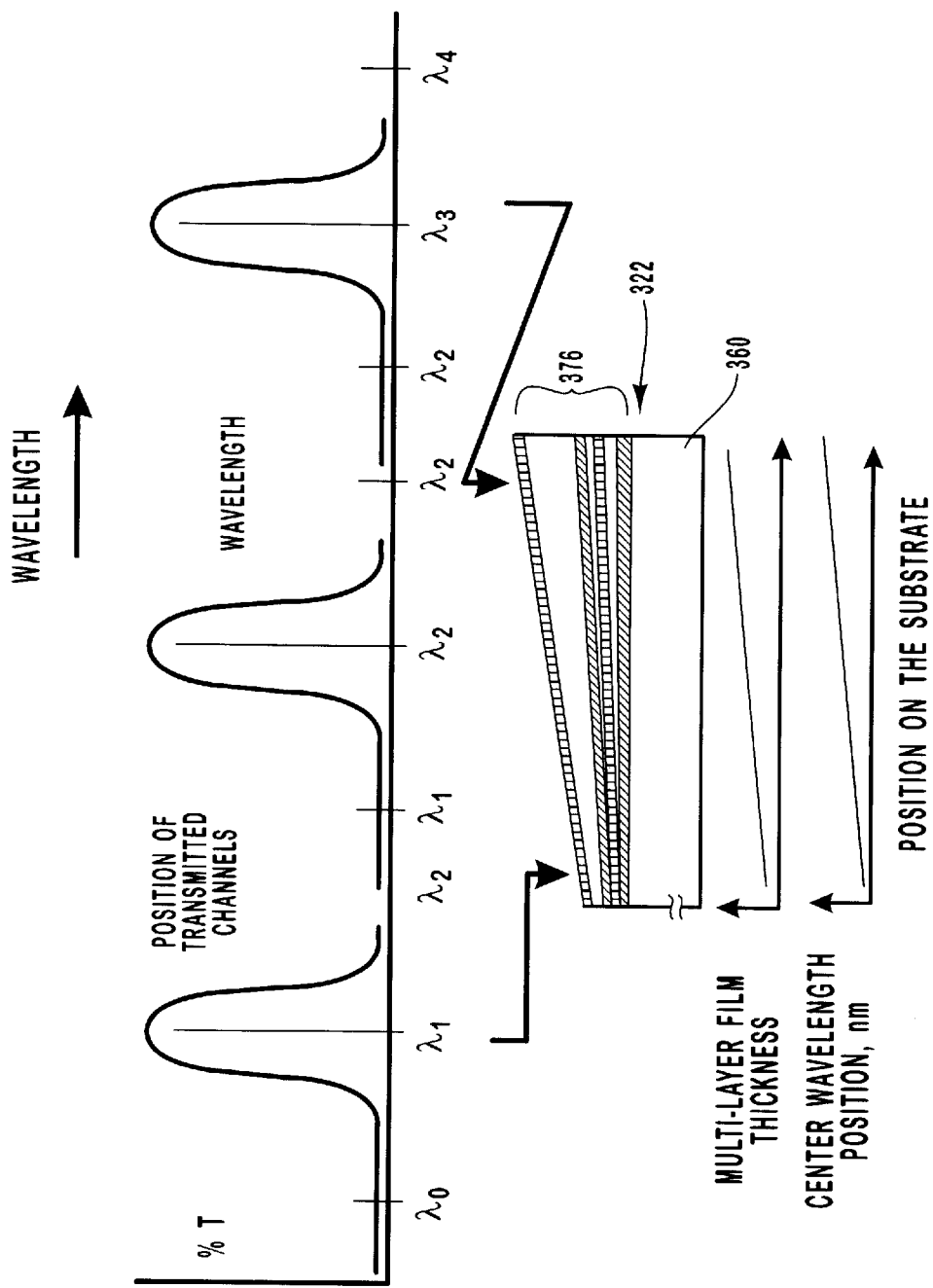
FIG. 13 is a schematic representation of another alternate embodiment of an optical filter according to the present invention.

FIG. 13 illustrates an additional embodiment of an optical switch element 322 with assorted graphical representation of the transmittance relative to translation of the optical filter element. Optical switch element 322 includes a linear variable filter 376 disposed on a substrate 360. Optical switch element 322 attenuates various wavelengths of light, dependent on the particular location that the light is incident upon the optical switch element 322. This is achieved by linearly varying the thickness of the optical coatings that form linear variable filter 376 of optical switch element 322. By selectively translating optical switch element 322, any of the optical channels $\lambda 1$, $\lambda 2$, or $\lambda 3$ corresponding to the wavelengths represented in linear variable filter 376 may be selected. Though numerous optical filters are described herein, one skilled in the art may identify various other useful optical multi-layer interference filters, such as notch filters, gain flattening filters, and the like.

Referring to FIG. 2, the optical filters of the present invention are capable of being translated in relation to the optical signal channels transmitted and received by waveguides 12a, 12b, and 12c. Reference will be made to a discussion of optical switch element 22; however, a similar discussion is applicable for optical switch elements 122, 222, and 322. Optical switch element 22 may be translated manually or by various forms of electromechanical actuators, such as solenoids, stepper motors, piezo-electric positioning devices, and linear variable transducers. Examples of electromechanical drive systems that have been developed for optical switches are disclosed in U.S. Pat. Nos. 5,642,446 and 5,790,314, among others. Another example of an electromechanical positioning system for use with an optical switch element according to the present invention is described in co-pending, co-assigned U.S. patent application Ser. No. 09/454,022, entitled OPTICAL SWITCH WITH FLEXURE PIVOT by Richard Ian Seddon, filed Dec. 3, 1999 (Attorney Docket No. 13392.319), the disclosure of which is hereby incorporated for all purposes. These switches provide for high switching speed and low insertion loss due to the precise positioning and translation of the optical filter element. It may be appreciated that the switching speed can be reduced proportionately to the linear displacement of optical switch element 22. Thus, a small beam size and short linear displacement contribute to a short switching time. However, to maximize the signal isolation between the selected and non-selected channels, all of the incident light beam should project onto the broadband reflective region or the wavelength selective region. Therefore, the distanced traveled by the optical switch element is generally at least as large as the diameter of the incident beam. However, reducing the diameter of incident beam and the linear displacement of the optical switch element to reduce the switching time has practical limitations. For example, reducing the beam size will increase the beam divergence and complexity of aligning each collimator with the optical switch element, so that the express collimator collects substantially all of the reflected optical signal and the add/drop collimator can collect substantially all of the transmitted optical signal. Additionally, reduced beam size requires greater stability of the actuator-filter assembly.

Figure 14:
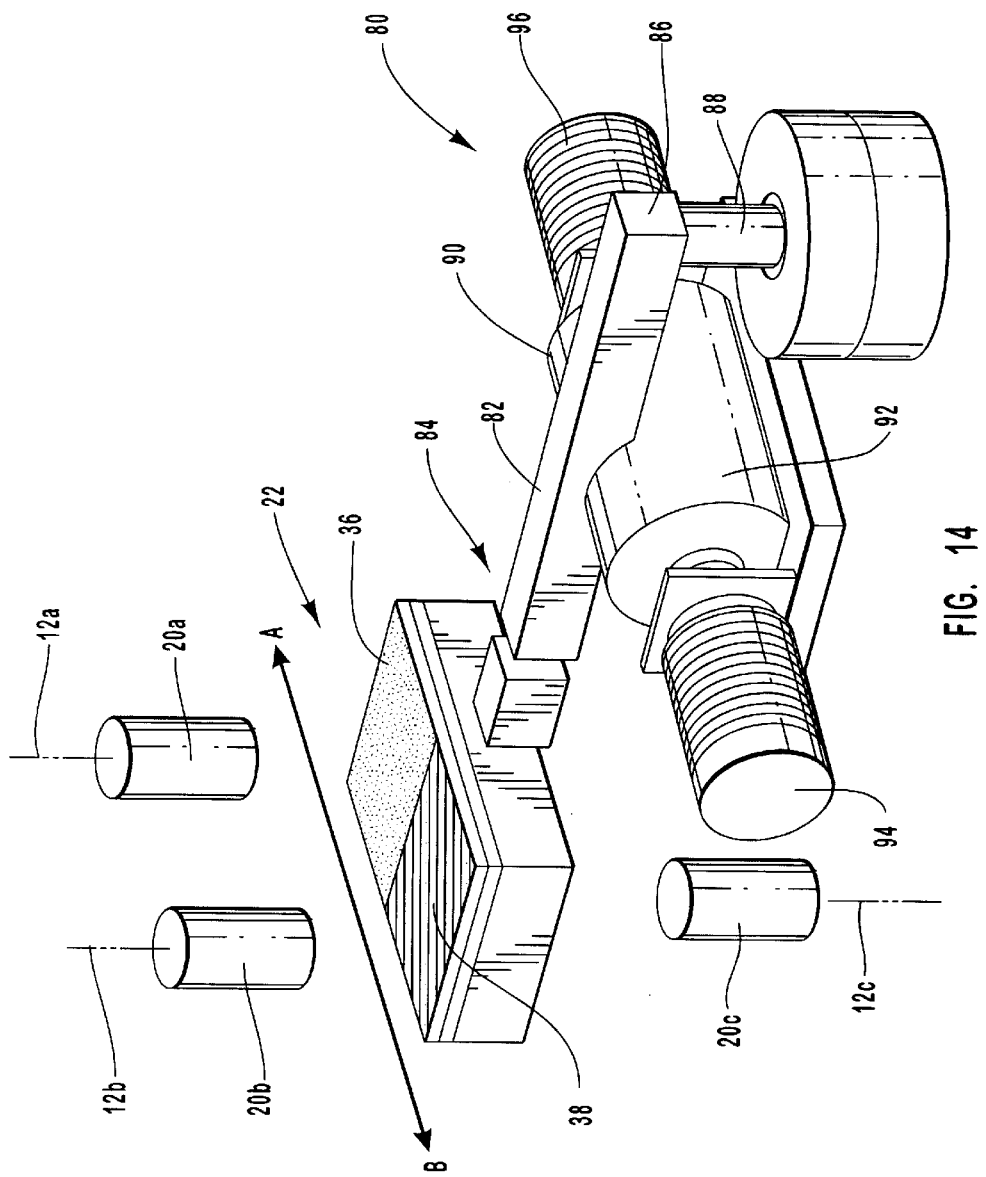
FIG. 14 is a simplified perspective schematic representation of an actuator portion of an optical switch suitable for use with the present invention.

FIG. 14 is a simplified perspective view of a structure capable of translating an optical switch element 22. An electromechanical actuator 80 is coupled to the optical switch element 22, which is mounted on a first end 84 of an armature 82. Affixed to a second end of armature 82 is a shaft 88 that allows armature 82 to rotate about the shaft in response to the lateral displacement of a slider 90. The slider 90 is coupled to the armature 82 and includes a magnet 92 that is responsive to electromagnets 94 and 96. Therefore, activation of electromagnets 94, 96 induces attraction and repulsion of magnet 92 towards one and from the other, thereby moving armature 82 and hence optical switch element 22.

Figure 15:
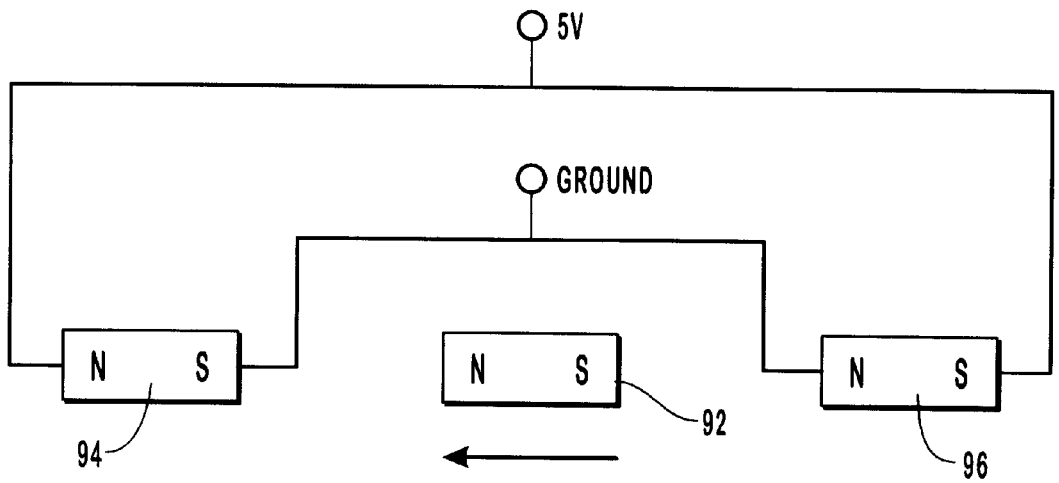
FIG. 15 is a simplified schematic depiction of the electrical circuitry of the actuator of FIG. 14, in a first state.
Figure 16:
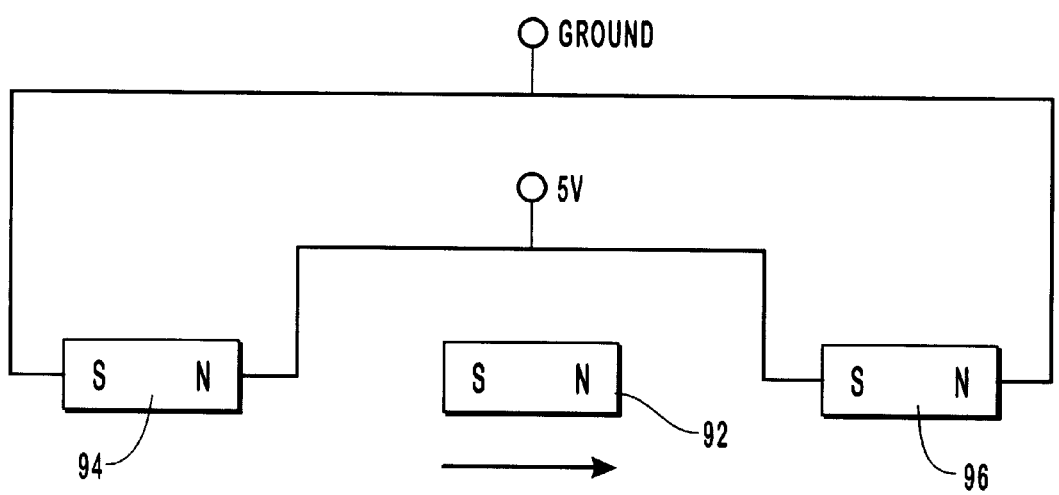
FIG. 16 is a simplified schematic depiction of the electrical circuitry of the actuator of FIG. 14, in a second state.

FIGS. 15 and 16 are simplified schematics of electrical circuit diagrams for the alternate positions of slider 90 in response to the bias induced upon magnet 92 by electromagnets 94, 96. FIG. 15 depicts translation to the left, while FIG. 16 depicts translation to the right. An electrical switch (not shown) switches the 5 V and ground signals, as shown, which reverses the polarity of each electromagnet. The action of the electromagnets on the movable magnet causes the optical filter element to be located such that either the broadband reflective region or the wavelength selective region is in the path of the first (common) beam.

Generally, the electromagnetic actuator as described herein is highly reliable and provides switch speeds less than about 20 millisecond. If actuator 80 fails, or becomes disconnected from a power source, actuator 80 will remain in a latched state (by virtue of the permanent magnet being attracted to a core (not shown) of the electromagnet, for example) such that only the selected channel(s) is lost in the worst case scenario, the remainder being expressed. The latched state allows even a failed switch to be a highly reliable passive device.

It can be appreciated by one skilled in the art that various other embodiments of actuators are possible so long as they are capable of translating the optical switch element with the desired accuracy and speed. The embodiment described in FIG. 14 is desirable because the switching occurs rapidly, in less than about 20 msec., without significant switch "bounce", that is a damped oscillation, of armature 82 and optical switch element 22. Switch bounce generally must be accommodated in allowing for switch time; therefore, limiting the switch bounce reduces the required switching time. As an alternative to the actuation method described in FIG. 14, the optical switch element may be rotated or linearly translated. A rotary drive system suitable for use in the present invention is disclosed in U.S. Pat. No. 5,506,731. A rotary drive system may be used with a circular variable optical filter in a manner analogous to the linear variable filter of optical switch element 322, shown in FIG. 13. U.S. Pat. Nos. 5,218,473; 3,442,572; and 3,539,824 disclose various designs and methods for making spatially variable bandpass filters.

Figure 17:
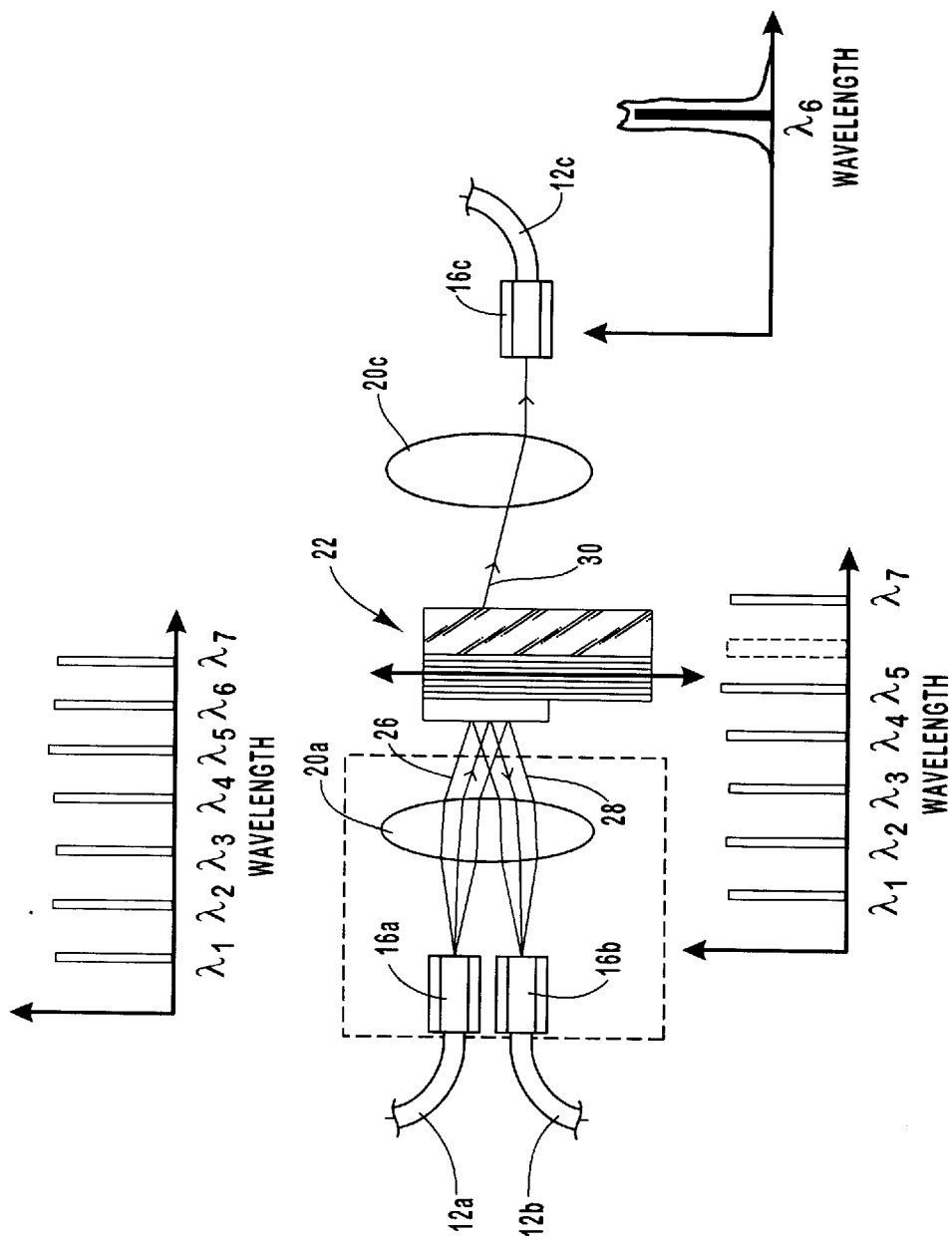
FIG. 17 is a schematic representation and associated spectral characteristics of an alternate embodiment of an optical switch according to the present invention.

FIG. 17 is a simplified schematic of components of an optical switch according to the present invention with associated representations of the spectral components of various ports. Waveguides 12a, 12b, and 12c are arranged to optically communicate with optical switch element 22. Each optical fiber 12a, 12b, and 12c is held in place by respective ferrules 16a, 16b, 16c. Additionally, ferrules 16a, 16b, 16c provide a fixed relationship between the end of optical fiber 12a, 12b, 12c and respective collimators 20a and 20c disposed between optical switch element 22 and optical fibers 12a, 12b, and 12c. Two optical fibers, 12a and 12b, are optically coupled to a single collimator 20a. Although each fiber 12a, 12b is shown with its own ferrule 16a, 16b, it is understood that a single ferrule could accommodate two fibers. The collimators are generally situated such that the focal point, of collimator 20a for example, is coincident with the front surface of the optical switch element 22. Optical fibers 12a, 12b are offset an equal distance from the optical axis of collimator 20a and opposite each other in the radial direction.

In this particular embodiment, collimator 20a is a single lens, preferably an aspheric or GRIN lens. As such, collimator 20a collimates both light emitted by common waveguide 12a toward the optical switch element, as well as light reflected from the optical switch element towards the express waveguide 12b. Collimator 20c is preferably of the same type as collimator 20a and collimates the "drop" optical signal beam that would pass through the optical switch element when placed such that the input beam falls on the wavelength selective portion of the optical switch element.

GRIN lenses suitable for use with optical fibers are produced under the trade name "SELFOC"; which is registered in Japan and owned by the Nippon Sheet and Glass Co. Ltd. When light propagating within an optical fiber, is to be passed through a discrete optical element coupled to the optical fiber, the light must exit an end face of the fiber, be collimated, and the collimated beam must be directed towards the discrete optical element. In many instances, a GRIN lens capable of collimating diverging light rays exiting an optical fiber is disposed between the optical fiber and subsequent discrete optical elements. In such an instance, where light is to pass from one optical fiber to another through an optical element, a pair of matched quarter pitch GRIN lenses may be placed within a gap between the two optical fiber end faces. Thus, in operation light exits a first optical fiber, is collimated by a first quarter pitch GRIN lens, passes through a discrete optical element disposed between the pair of matched quarter pitched GRIN lenses, and is focused by the second quarter pitch GRIN lens of the pair into an end of a second optical fiber.

Alternatively, a plurality of optical fiber pairs may be arranged along a circumference and spaced a fixed radial distance from the axis of lens 20a, providing for either the cascading of a optical signal channels (from a single optical fiber trunk line) through the same optical filter or a switching a plurality of optical fiber trunk lines. GRIN lenses are commonly available to meet a variety of specifications at a relatively low cost, and since these lenses are relatively compact, their use has become nearly ubiquitous in field of opto-electronics.

The resulting collimated beams 26, 28, and 30 preferably have diameters from about 50 to 1,000 microns. More preferably, collimated beams 26, 28, and 30 have diameters from about 300 to 600 microns. Most preferably, collimated beams 26, 28, and 30 have diameters from about 400 to about 500 microns.

FIGS. 18 and 19 are simplified schematic representations of drop and add configurations of a switch according to the present invention. The optical switch 410 includes optical fibers 12*a*, 12*b*, 12*c*, and 12*d*. Optical fiber 12*a* is the common waveguide, while optical fiber 12*b* is the express channel. Optical fiber 12*c* is the add channel, while optical fiber 12*d* is the drop channel. In this embodiment, both the common and express optical signal channels are collimated by the same collimator 20*a*, in a similar manner to that described in reference to FIG. 17. In FIG. 18, optical switch 410 "drops" an optical signal to optical fiber 12*d* and reflects all other optical signal channels to express optical fiber 12*b*. In FIG. 19, optical switch 410 "adds" an optical from optical finer 12*c* that combines with the "common" optical signals.

Figure 20:
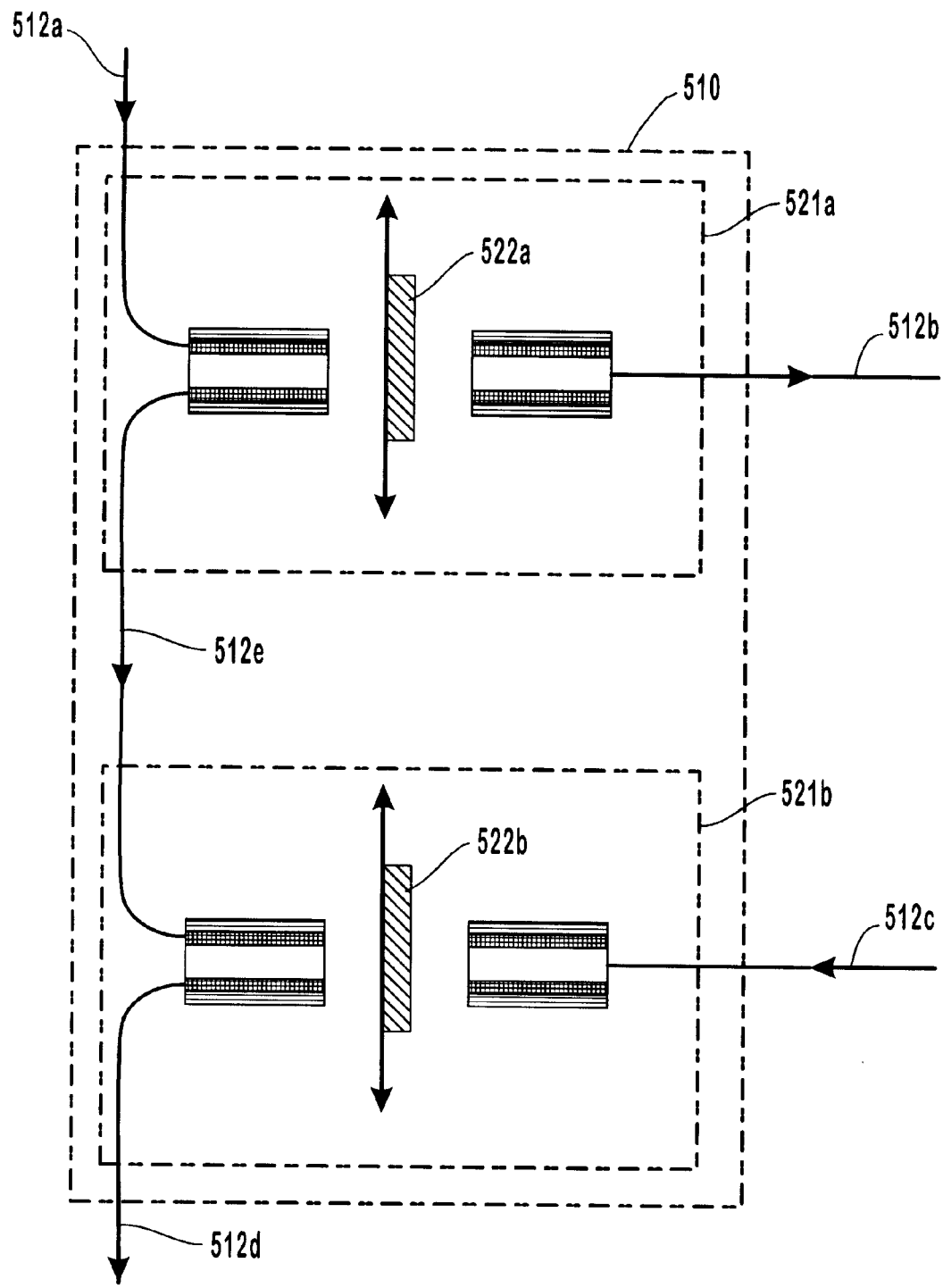
FIG. 20 is a schematic representation of yet another embodiment of the optical switch of the present invention.

FIG. 20 is a simplified schematic representation of an alternative configuration of an optical switch 510. The majority of the features discussed with respect to optical switch 10 also apply to optical switch 510. The embodiment of this invention, illustrated schematic in FIG. 20, represents a cascading type 4-port "add/drop" optical switch formed from two 3-port wavelength selective optical switches 521*a*, 521*b* (dash-dot-dot-dashed line). Though the "add/drop" optical switch 510 is shown as a 4-port switch, the same cascading principal of the 3-port switch may be used to connect a plurality of 3-port switches to form a wide variety of network topographies, and hence to perform other switching functions.

The two 3-port wavelength selective switches 521*a*, 521*b* are coupled such that a signal channel can be dropped from the common optical signal in the first wavelength selective switch 521 a, and another signal on that same channel can be added to the express signal by the second wavelength selective switch 521*a*. The optical switch elements 522*a* and 522*b* switch in parallel, so that each wavelength selective switch 521*a* and 521*b* is either both in a wavelength selective mode or both in a broadband reflective mode. In one embodiment, the 3-port switches are switched independently. In another embodiment, both switches are switched in response to a single switch signal, and in yet another embodiment, an optical switch element or set of optical switch elements are moved by a single actuator to simultaneously switch the add and drop channels. The selected wavelength for both optical switch elements 522*a* and 522*b* is essentially the same when dropping and adding the same channel; however, the filter characteristics of the wavelength selective regions on the respective optical switch elements may be different, such as optimizing pass-band flatness on one and out-of-band rejection on the other, for example. When both wavelength selective switches are in the wavelength selective state, the selected channel is dropped via fiber 512*b* in the first wavelength selective switch, with the remaining channels reflected to fiber 512*e* and expressed to the second wavelength selective switch. A new signal may then be added via fiber 512*c* at the dropped channel wavelength, which is added to the express signal, the sum of the channels being carried on fiber 512*d*. Thus, if signals on a channel are removed from the common fiber, signals can be added to maintain efficient use of the available fiber bandwidth. If both wavelength selective switches are in the broadband reflective mode, then the common signal arriving on fiber 512*a* is reflected off of both optical switch elements 522*a*, 522*b*, and expressed on fiber 512*d*.

Figure 21:
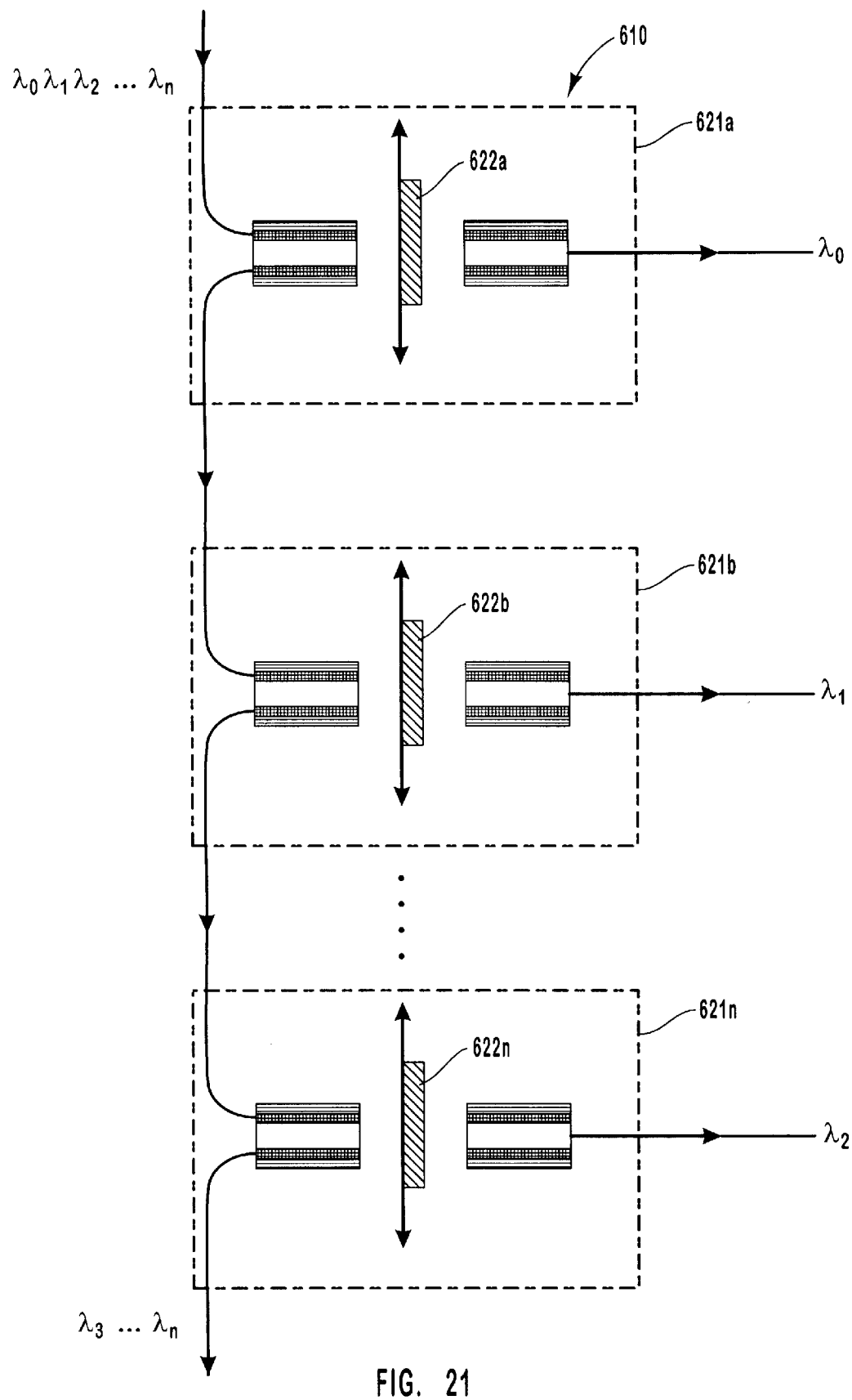
FIG. 21 is a schematic representation of another embodiment of the optical switch of the present invention.

FIG. 21 is a simplified schematic of a cascaded configuration of an optical switch 610 according to the present invention. The majority of the features discussed with respect to optical switch 10 also apply to optical switch 610. Optical switch 610 includes a plurality of the 3-port optical switches 621*a*, 621*b*, . . . 621*n* (dashed-dot-dot line) that are combined in series. The 3-port switches are wavelength selective switches as shown in FIG. 1, for example. The express port of the optical switch 621*a* is optically coupled to the input port of optical switch 621*b*, etc. The optical switch elements 622*a*, 622*b*, . . . 622*n* include wavelength selective filter portions that are different from one another, each wavelength selective filter portion corresponding to a channel, represented by $\lambda 0$–$\lambda n$. Actuation of one of any one of the 3-port switches allows selection of the associated channel to be dropped from the common signal and routed to the associated selected output.

Figure 22:
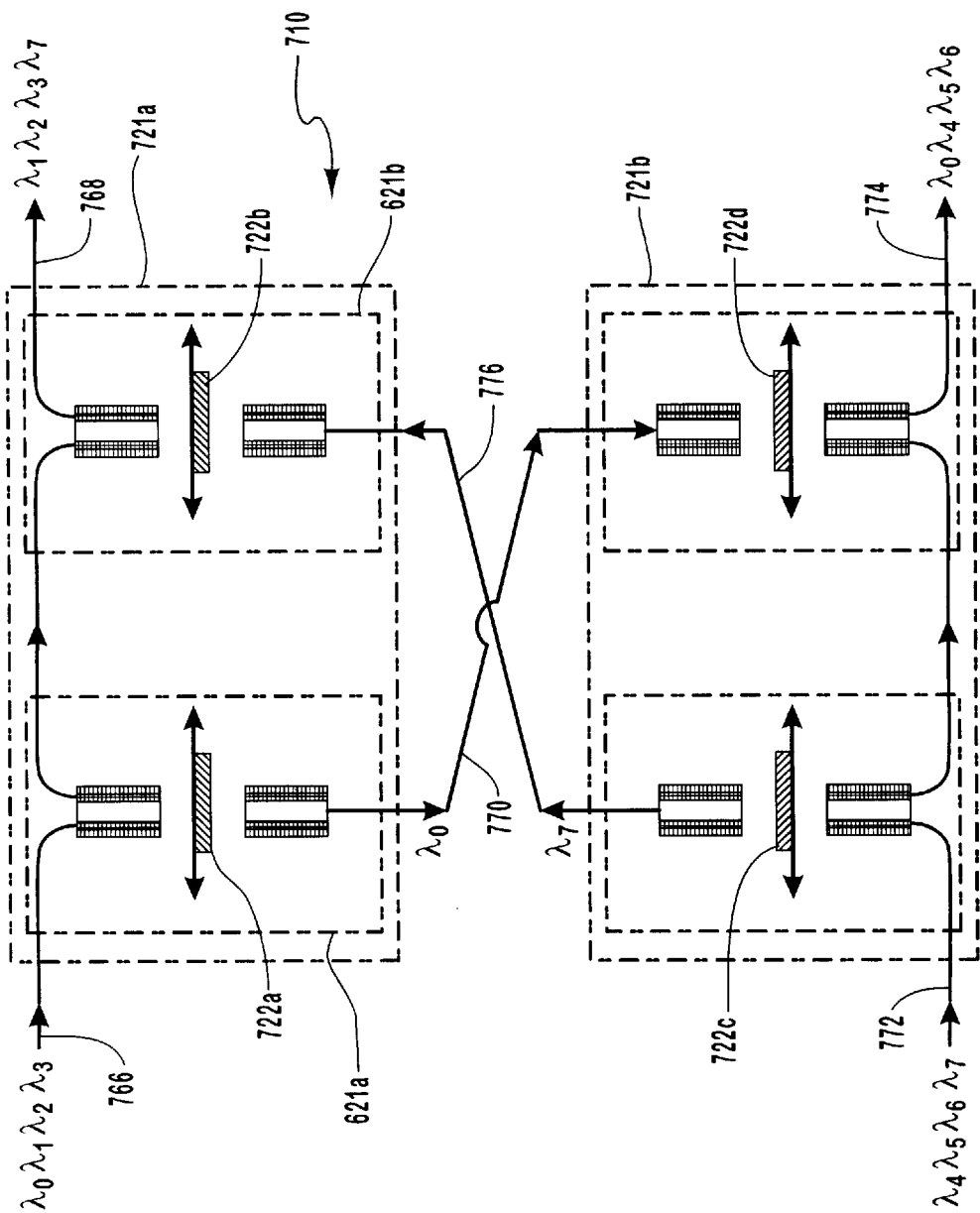
FIG. 22 is a schematic representation of still yet another embodiment of the optical switch of the present invention.

FIG. 22 is a simplified schematic of another embodiment of an optical switch 710 of the present invention. The majority of the features discussed with respect to optical switch 10 also apply to optical switch 710. Optical switch 710 includes two or more three-port add/drop optical switches 621*a* and 621*b* (dashed line) as discussed in reference to FIG. 20. Optical switches 721*a* and 721*b* are connected in parallel between two fiber-optic trunk lines to form a cross connection optical switch 710. Optical signals $\lambda 0$, $\lambda 1$, $\lambda 2$, $\lambda 3$ arrive along the input portion 766 of a first fiber-optic trunk line to the first 4-way switch 721 a, which drops $\lambda 0$. The through channel signals, $\lambda 1$, $\lambda 2$, and $\lambda 3$ continue to the output portion 768 of the first trunk line, while $\lambda 0$ is routed to the add port of the second 4-way switch 721*b* via optical fiber segment 770.

Similarly, optical signals $\lambda 4$, $\lambda 5$, $\lambda 6$, $\lambda 7$ arrive along the input portion 772 of a second fiber-optic trunk line to the second 4-way switch 721*b*. The through channel signals $\lambda 4$, $\lambda 5$, and $\lambda 6$ continue into the output portion 774 of the second trunk line, while optical signal channel $\lambda 7$ is dropped from the second trunk line and is added to the first trunk line at the add port of the first 4-way switch 721*a* via optical fiber segment 776.

This configuration permits the exchange of optical signals between trunk lines. Optical signals that are changed between trunk lines are preferably the same wavelength, however, where trunk A and trunk B do not carry any common channels, the 4 way switches 721*a*, 721*b* can be configured to add or drop signals of different wavelengths.

This is achieved by selection of different wavelength selective filters for the optical switch elements 722*a*, 722*b*, 722*c*, and 722*d* in the four 3-way switches.

EXAMPLES OF DEVICE PERFORMANCE

1. Example 1

The optical switch shown in FIG. 20 was constructed using optical switch element 22 depicted in FIGS. 2 and 3. A narrow (less than 100 GHz.) bandpass filter was deposited onto a glass substrate. An opaque aluminum layer, about 150 to 200 nm thick was deposited onto a region of the narrow bandpass filter to form a non-wavelength selective filter region having a reflectivity greater than about 90%, the un-coated bandpass filter forming the wavelength selective filter region. The coated side of the glass substrate was illuminated by first beam 26 and the angle between first beam 26 and second beam 28 is about 4 degrees. In an alternate embodiment using a 2-fiber ferrule and common collimator, the angle is about 1.8 degrees, but may be varied according to the fiber spacing. The static and dynamic response was characterized with an optical spectrum analyzer and photo-detector output connected to an oscilloscope. The response was measured at wavelengths corresponding to optical channels having a 100 GHz. spacing.

Figure 23:
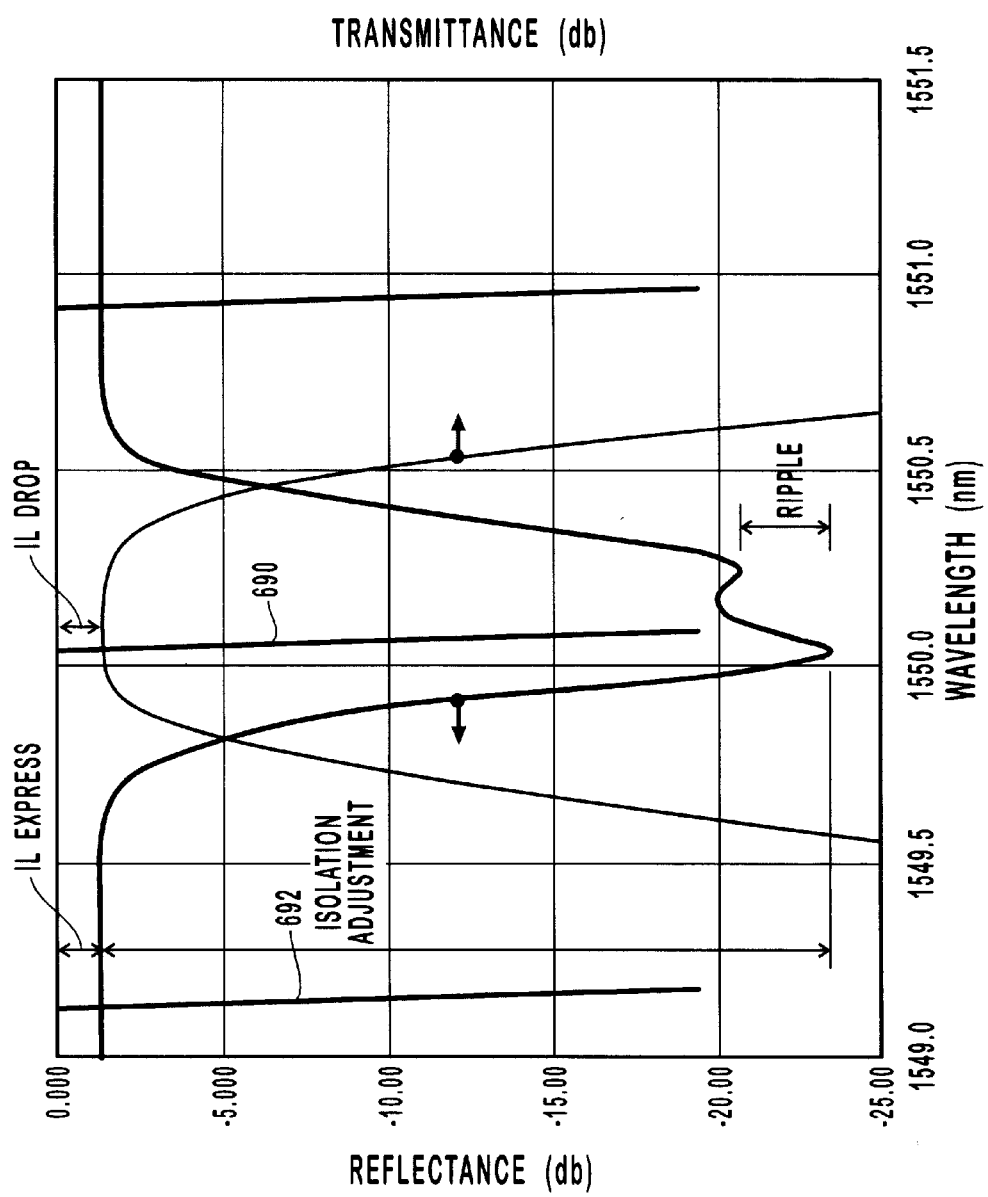
FIG. 23 is a graphic representation of the spectral performance of the optical switch of FIG. 20.

FIG. 23 shows the spectral performance of one dielectric interference bandpass filter, in accordance with the teaching of the present invention. Transmittance (for the drop channel) and reflectance (for the express channels) are plotted against wavelength to show the signal loss in decibels (dB) at optical switch element 22. For purposes of convenient illustration, the power lost in either reflection or transmission will be referred to as "insertion loss". The insertion losses for the dropped (ILdropped) and express (ILexpress) channels are shown at their respective channel position (straight vertical lines 690 and 692, respectively); is defined by the spectral performance of the wavelength selective filter.

Figure 24:
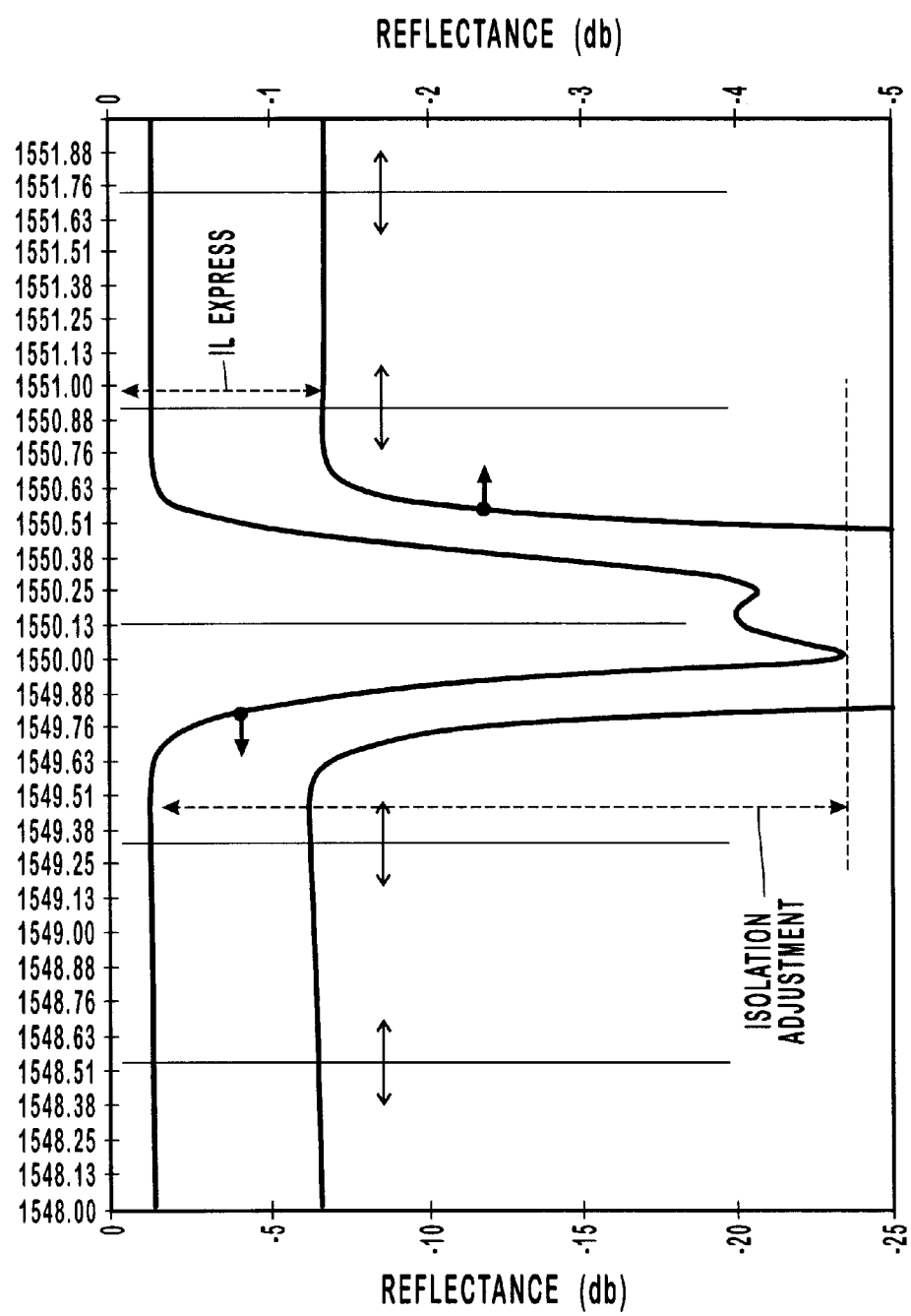
FIG. 24 is another graphic representation of the spectral performance of the optical switch of FIG. 20.

FIG. 24 illustrates the spectral performance (reflectance) of the express channel only, but is simultaneously plotted on a 0 to −25 dB scale, on the left abscissa, and 0 to −5 dB scale on the right abscissa and illustrates the isolation of the adjacent channel and insertion losses for the express channel, ILexpress. The spectral response of the express and drop channels have been described with respect to FIGS. 23 and 24, and are compiled below, in Table 1, with the dynamic response.

TABLE 1

| Parameter | Value | Condition |
|---|---|---|
| IL drop channel | <2.0 dB | without connectors |
| IL express-in the selective and non-selective switch states | <1.5 dB | without connectors |
| Switch Time complete | <20 msec. | fully damped -- no ringing |
| Switch Time | <10 msec. | Time at <0.2 dB loss |
| Ringing | <0.5 dB | all channels |
| IL, Δ, express Difference between IL express-in the selective and non-selective switch states | <0.5 dB | Selective and non-selective switch |

2. Example 2

In order to reduce the ringing and IL, Δ, express losses the aluminum reflector can be replaced with either a metallic coating, multi-layer dielectric, or metallic-dielectric coating having a reflectivity greater than about 98%. This results in ringing of less than about 0.1 dB and IL, Δ, express of less than about 0.2 dB In general, the novel embodiments of the present invention have numerous advantages over existing optical switches. The presently described optical switch is small and compact, where one embodiment of the present invention has dimensions less than about 2"×1"×0.5". Though the optical switch of the present invention is compact, there is minimal disturbance of adjacent channels during switching, while the insertion loss on all channels and the adjacent channel tilt are low. Those skilled in the art will appreciate that the dimensions provided above are exemplary, and that the size can depend on the size of the components used, the layout of the switch, the type of actuating mechanism used, and other factors.

The present invention may be embodied in other specific forms without departing from its spirit or essential characteristics. The described embodiments are to be considered in all respects only as illustrative and not restrictive. For example, although an add/drop switch has been specifically described, the selected channel(s) could be directed to an attenuator, detector, or other device, for example. Accordingly, the scope of the invention is indicated by the appended claims rather than by the foregoing description. All changes that come within the meaning and range of equivalency of the claims are to be embraced within their scope.

What is claimed is:

1. An optical switch comprising:
    an input optical fiber section capable of providing an optical signal;
    an express optical fiber section;
    a ferrule containing the input optical fiber section and the express optical fiber section, the ferrule being mechanically coupled to
    a collimator to optically couple the input optical fiber section and the express optical fiber section to the collimator, the collimator being disposed to optically couple the optical signal to
    an optical switch element having a broadband reflective region and a wavelength selective region, the wavelength selective region being capable of transmitting at least a selected channel of the optical signal through the optical switch element and reflecting at least a remaining portion of the optical signal through the collimator to the express optical fiber section; and
    an actuator mechanically coupled to the optical switch element and configured to move the optical switch element between a first switch position and a second switch position, the first switch position disposing the broadband reflective region in a path of the optical signal to reflect the optical signal to the express optical fiber section, and the second switch position disposing the wavelength selective region in the path of the optical signal to allow transmission of the selected channel through the optical switch element and to reflect at least the remaining portion of the optical signal to the express optical fiber section.

2. The optical switch of claim 1 further comprising a third port configured to drop a selected drop channel from the optical signal by transmission through the optical switch element to the third port.

3. The optical switch of claim 1 further comprising a third port configured to add a selected add channel to the optical signal by transmission through the optical switch element to the express optical fiber section.

4. The optical switch of claim 1 wherein the wavelength selective region comprises a plurality of dielectric layers.

5. The optical switch of claim 4 wherein the wavelength selective region comprises a bandpass filter, the bandpass filter reflecting non-selected channels.

6. The optical switch of claim 5 wherein the bandpass filter has a bandwidth of between about 50–100 GHz.

7. The optical switch of claim 5 wherein the bandpass filter is disposed between the collimator and a reflective portion of the broadband reflective region when the optical switch element is in the first switch position.

8. The optical switch of claim 4 wherein the wavelength selective region comprises a linear variable filter.

9. The optical switch of claim 4 wherein the broadband reflective region comprises a second plurality of dielectric layers.

10. The optical switch of claim 1 wherein the broadband reflective region comprises a metal film.

11. The optical switch of claim 1 further comprising an anti-reflective coating disposed between the collimator and both the broadband reflective region and the wavelength selective region.

12. The optical switch of claim 11 wherein the anti-reflective coating is disposed on a first surface of the optical switch element, the first surface being proximate to the collimator, a wavelength selective filter being disposed on a second surface of the optical switch element, the second surface being distal from the collimator, and a reflective coating being disposed on a selected portion of the wavelength selective filter, the combination of the reflective coating and the selected portion of the wavelength selective filter being the broadband reflective region.

13. The optical switch of claim 1 further comprising a post filter and a third port, the post filter being disposed between the optical switch element and the third port.

14. The optical switch of claim 1 wherein the wavelength selective region is configured to transmit a plurality of adjacent channels through the optical switch element.

15. The optical switch of claim 1 wherein the wavelength selective region comprises a wavelength selective filter and wherein a portion of the wavelength selective filter overlaps the broadband reflective region, the portion of the wavelength selective filter overlapping the broadband reflective region being disposed between the collimator and the broadband reflective region when the optical switch element is in the first switch position.

16. The optical switch of claim 1 further comprising a post filter and a third port wherein the post filter is disposed between the wavelength selective region and the third port.

17. An optical switch comprising:
an input port capable of receiving an optical signal and providing the optical signal to
an optical switch element having
a broadband reflective region and
a bandpass filter having
a first portion of the bandpass filter configured to transmit at least a selected channel through the optical switch element and reflecting at least a remaining portion of the optical signal, and
a second portion of the bandpass filter overlapping at least a portion of the broadband reflective region;
an express port; and
an actuator mechanically coupled to the optical switch element and configured to move the optical switch element between a first switch position and a second switch position, the first switch position disposing the broadband reflective region in a path of the optical signal to reflect the optical signal to the express port, and the second switch position disposing the first portion of the bandpass filter in the path of the optical signal to allow transmission of the selected channel through the optical switch element and to reflect at least the remaining portion of the optical signal to the express port, wherein the second portion of the bandpass filter is disposed between the input port and the broadband reflective region when the optical switch element is in the first switch position.

18. The optical switch of claim 17 wherein the first portion of the bandpass filter is configured to transmit a plurality of adjacent channels through the optical switch element.

19. The optical switch of claim 17 wherein the broadband reflective region comprises a plurality of dielectric layers.

20. An optical switch comprising:
an input port capable of receiving an optical signal and providing the optical signal to
an optical switch element having a broadband reflective region and a wavelength selective region, the wavelength selective region being capable of transmitting a selected channel through the optical switch element and reflecting at least a remaining portion of the optical signal;
an express port
an actuator mechanically coupled to the optical switch element and configured to move the optical switch element between a first switch position and a second switch position, the first switch position disposing the broadband reflective region in a path of the optical signal to reflect the optical signal to the express port, and the second switch position disposing the wavelength selective region in the path of the optical signal to allow transmission of the selected channel through the optical switch element and to reflect at least the remaining portion of the optical signal to the express port;
a third port; and
a post filter disposed between the optical switch element and the third port.

21. The optical switch of claim 20 wherein the wavelength selective region comprises a first bandpass filter with a first passband and the post filter comprises a second bandpass filter with a second passband.

22. A method of fabricating an optical switch element comprising:
providing an optical substrate;
forming an anti-reflective coating on a first surface of the optical substrate;
depositing a plurality of dielectric layers on a second surface of the optical substrate to form a wavelength selective filter; and
forming a reflective layer over a selected portion of the wavelength selective filter.

23. The method of claim 22 wherein the forming a reflective layer comprises depositing a plurality of dielectric layers.

24. A four-port add/drop optical switch comprising:
a first three-port optical switch having
an input optical fiber section optically coupled to a first collimator,
a first express optical fiber section optically coupled to the first collimator,
a first optical switch element movably disposed on a first actuator between the first collimator and
a second collimator, the second collimator being optically coupled to a drop optical fiber section, the first optical switch element having a first wavelength selective region and a first broadband reflective region, the first wavelength selective region capable of transmitting a first selected range of wavelengths from the first collimator to the second collimator, the first actuator capable of moving the first optical switch element between a first switch position and a second switch position, the first switch position optically coupling the first wavelength selective region between the first collimator and the second collimator, and the second switch position optically coupling an input signal from the input optical fiber section to the first broadband reflective region and to the first express optical fiber section; and
a second three-port optical switch having
the first express optical fiber section optically coupled to a third collimator,
a second express optical fiber section optically coupled to the third collimator, a second optical switch element movably disposed on a second actuator between the third collimator and a fourth collimator, the fourth collimator being optically coupled to an add optical fiber section, the second optical switch element having a second wavelength selective region and a second broadband reflective region, the second wavelength selective region capable of transmitting a second selected range of wavelengths from the third collimator to the fourth collimator, the second actuator capable of moving the second optical switch element between a third switch position and a fourth switch position, the third switch position optically coupling the second wavelength selective region between the third collimator and the fourth collimator, and the fourth switch position optically coupling a signal from the first express optical fiber section to the second broadband reflective region and to the second express optical fiber section.

25. The optical switch of claim 24 wherein the first selected range of wavelengths is essentially equal to the second selected range of wavelengths.

26. The optical switch of claim 24 wherein the first actuator and the second actuator are both moved in response to a switch signal.

27. The optical switch of claim 26 wherein the first optical switch element and the second optical switch element is mounted on an actuator comprising the first actuator and the second actuator.

28. A four-port add/drop optical switch comprising:

a first three-port optical switch having
an input optical fiber section optically coupled to a first collimator, a first express optical fiber section optically coupled to the first collimator, a first optical switch element movably disposed on a first actuator between the first collimator and a second collimator, the second collimator being optically coupled to a drop optical fiber section, the first optical switch element having a first wavelength selective region and a first broadband reflective region, the first wavelength selective region capable of transmitting a first selected range of wavelengths from the first collimator to the second collimator, the first actuator capable of moving the first optical switch element between a first switch position and a second switch position, the first switch position optically coupling the first wavelength selective region between the first collimator and the second collimator, and the second switch position optically coupling an input signal from the input optical fiber section to the first broadband reflective region and to the first express optical fiber section; and a second three-port optical switch having
the first express optical fiber section optically coupled to a third collimator, a second express optical fiber section optically coupled to the third collimator, a second optical switch element movably disposed on a second actuator between the third collimator and a fourth collimator, the fourth collimator being optically coupled to an add optical fiber section, the second optical switch element having a second wavelength selective region and a second broadband reflective region, the second wavelength selective region capable of transmitting a second selected range of wavelengths from the third collimator to the fourth collimator, the second actuator capable of moving the second optical switch element between a third switch position and a fourth switch position, the third switch position optically coupling the second wavelength selective region between the third collimator and the fourth collimator, and the fourth switch position optically coupling a signal from the first express optical fiber section to the second broadband reflective region and to the second express optical fiber section, wherein the first actuator is mechanically coupled to the second actuator and the first actuator and the second actuator are both moved in response to a switch signal.

29. A process for switching an optical signal, the process comprising:

providing an input signal from a first waveguide to a broadband reflective portion of an optical switch element;

reflecting the input signal from the broadband reflective portion of the optical switch element to a second waveguide; and moving the optical switch in a plane essentially normal to an axis of the input signal to remove the broadband reflective portion from a path of the input signal and to replace therewith a wavelength selective portion of the optical switch element, the wavelength selective portion transmitting a selected range of wavelengths between the optical signal element and a third waveguide.

30. An optical switch comprising:

means for providing an optical signal comprising a plurality of optical channels to an optical switch element, the optical switch element including a wavelength selective portion and a broadband reflective portion wherein a portion of the wavelength selective portion overlaps the broadband reflective portion;

means for translating the optical switch element between a first switch position and a second switch position;

means for receiving the plurality of optical channels when the optical switch element is in the first position to dispose the broadband reflective portion and the portion of the wavelength selective portion overlapping the broadband reflective portion in a signal path from the means for providing the optical signal, and for receiving at least a first portion of the plurality of optical channels when the optical switch element is in the second position to dispose the wavelength selective portion in the signal path, at least one of the plurality of optical channels being transmitted through the wavelength selective portion to means for receiving the at least one of the plurality of optical channels.

* * * * *